(12) United States Patent
Aihara et al.

(10) Patent No.: US 10,857,831 B2
(45) Date of Patent: Dec. 8, 2020

(54) DECALS WITH DIMENSIONAL OFFSETS

(71) Applicant: NIKE, Inc., Beaverton, OR (US)

(72) Inventors: Yuki Aihara, Portland, OR (US); Kimberly D. Baschak, Portland, OR (US); Jorge E. Carbo, Jr., Aloha, OR (US); David Sagan, Lake Oswego, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 16/874,035

(22) Filed: May 14, 2020

(65) Prior Publication Data

US 2020/0276858 A1    Sep. 3, 2020

Related U.S. Application Data

(63) Continuation of application No. 15/276,984, filed on Sep. 27, 2016, now Pat. No. 10,696,089.

(60) Provisional application No. 62/233,886, filed on Sep. 28, 2015.

(51) Int. Cl.
| | | |
|---|---|---|
| *B44C 1/17* | (2006.01) | |
| *B44C 3/02* | (2006.01) | |
| *D06Q 1/12* | (2006.01) | |
| *D06Q 1/00* | (2006.01) | |
| *B32B 3/08* | (2006.01) | |
| *B32B 3/30* | (2006.01) | |
| *B32B 7/14* | (2006.01) | |

(52) U.S. Cl.
CPC .......... *B44C 1/1716* (2013.01); *B32B 3/085* (2013.01); *B32B 3/30* (2013.01); *B32B 7/14* (2013.01); *B44C 1/1712* (2013.01); *B44C 3/025* (2013.01); *D06Q 1/00* (2013.01); *D06Q 1/12* (2013.01); *B32B 2437/00* (2013.01)

(58) Field of Classification Search
CPC ..... B44C 1/1712; B44C 1/1716; B44C 3/025; B32B 3/085; B32B 3/30; B32B 2437/00; D06Q 1/00; D06Q 1/12; A41D 27/08; D04D 7/04; Y10T 428/163; Y10T 428/183
See application file for complete search history.

(56) References Cited

U.S. PATENT DOCUMENTS

| | | |
|---|---|---|
| 3,553,062 A | 1/1971 | Berlin |
| 3,971,234 A | 7/1976 | Taylor |
| 4,012,552 A | 3/1977 | Watts |
| 4,054,697 A | 10/1977 | Reed et al. |
| 4,591,521 A | 5/1986 | Freno et al. |
| 5,296,277 A | 3/1994 | Wilson et al. |
| 5,449,540 A | 9/1995 | Calhoun et al. |

(Continued)

FOREIGN PATENT DOCUMENTS

| | | |
|---|---|---|
| CN | 203105742 U | 8/2013 |
| GB | 1244407 A | 9/1971 |

(Continued)

*Primary Examiner* — Catherine A. Simone
(74) *Attorney, Agent, or Firm* — Shook, Hardy and Bacon LLP

(57) ABSTRACT

Decals with dimensional offsets are disclosed. The decals may be part of a decal kit or may be applied to an article. The decals include an overlay having multiple dimensional spacers. When applied to an article, the decal overlay bonds to the article, securing the dimensional spacers between the overlay and the article creating dimensional offsets. The dimensional offsets are positioned on an interior surface of the article so that contact with a wearer's skin is minimized, reducing the perception of cling.

18 Claims, 14 Drawing Sheets

(56) References Cited

U.S. PATENT DOCUMENTS

| | | | |
|---|---|---|---|
| 5,597,434 | A | 1/1997 | Kukoff |
| 6,194,064 | B1 | 2/2001 | Keely et al. |
| 6,203,885 | B1 | 3/2001 | Sher et al. |
| 6,322,866 | B1 | 11/2001 | Sloot |
| 6,656,567 | B1 | 12/2003 | Abe et al. |
| 6,759,110 | B1 | 7/2004 | Fleming et al. |
| 6,911,243 | B2 | 6/2005 | Sher et al. |
| 7,687,126 | B2 | 3/2010 | Fleming et al. |
| 7,799,157 | B2 | 9/2010 | Kato et al. |
| 7,867,601 | B2 | 1/2011 | Ikishima et al. |
| 8,765,257 | B2 | 7/2014 | Weedlun |
| 8,834,974 | B1 | 9/2014 | Ferry et al. |
| 9,085,121 | B2 | 7/2015 | Mikami et al. |
| 2002/0011306 | A1 | 1/2002 | Hannington et al. |
| 2003/0017291 | A1 | 1/2003 | Fleming et al. |
| 2005/0003162 | A1 | 1/2005 | Sakurai et al. |
| 2007/0248817 | A1 | 10/2007 | Sieber et al. |
| 2010/0183814 | A1 | 7/2010 | Rios et al. |
| 2010/0196664 | A1 | 8/2010 | Kuiper |
| 2010/0226943 | A1 | 9/2010 | Brennan et al. |
| 2011/0014411 | A1 | 1/2011 | Hagiwara et al. |
| 2011/0307998 | A1 | 12/2011 | Turner |
| 2013/0101776 | A1 | 4/2013 | Lu et al. |
| 2013/0139952 | A1 | 6/2013 | Baklanov |
| 2017/0087924 | A1 | 3/2017 | Aihara et al. |

FOREIGN PATENT DOCUMENTS

| | | |
|---|---|---|
| WO | 00/15444 A2 | 3/2000 |
| WO | 2015/059734 A1 | 4/2015 |
| WO | 2017/058847 A1 | 4/2017 |

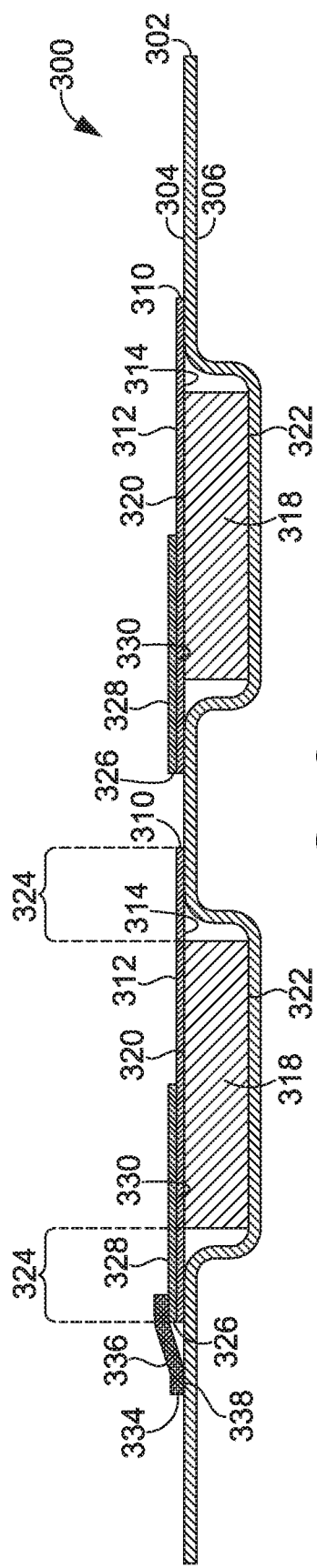
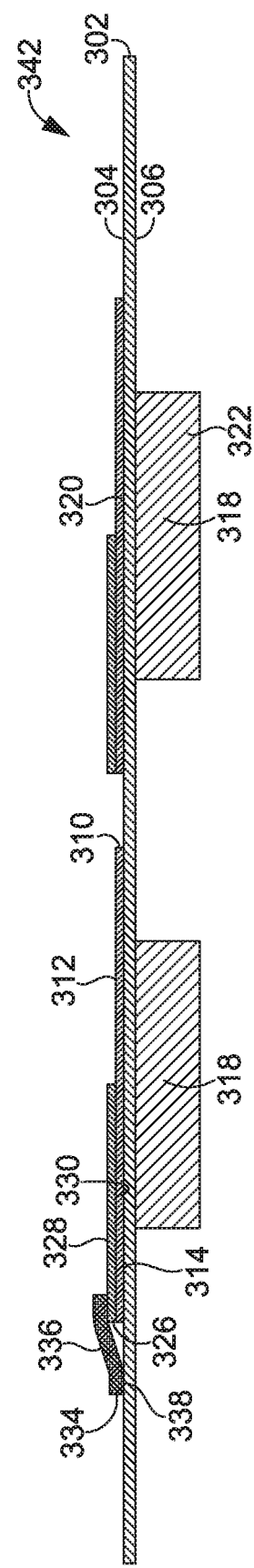

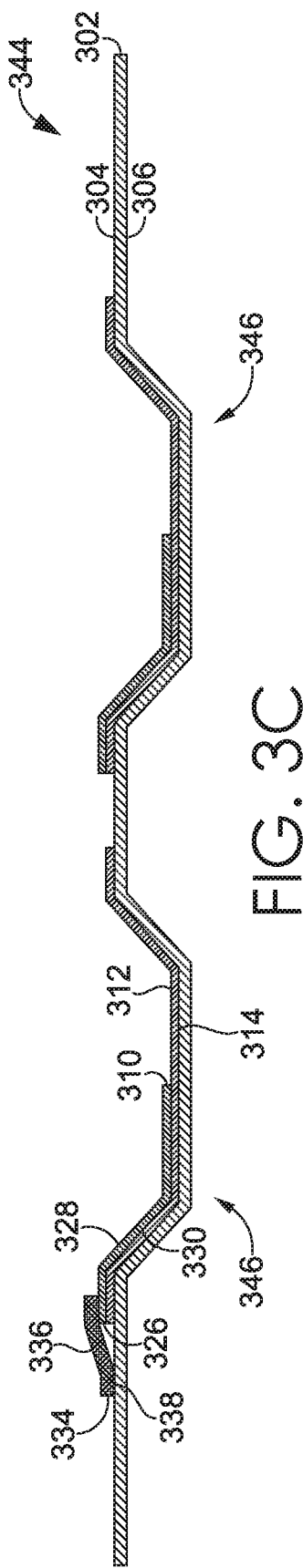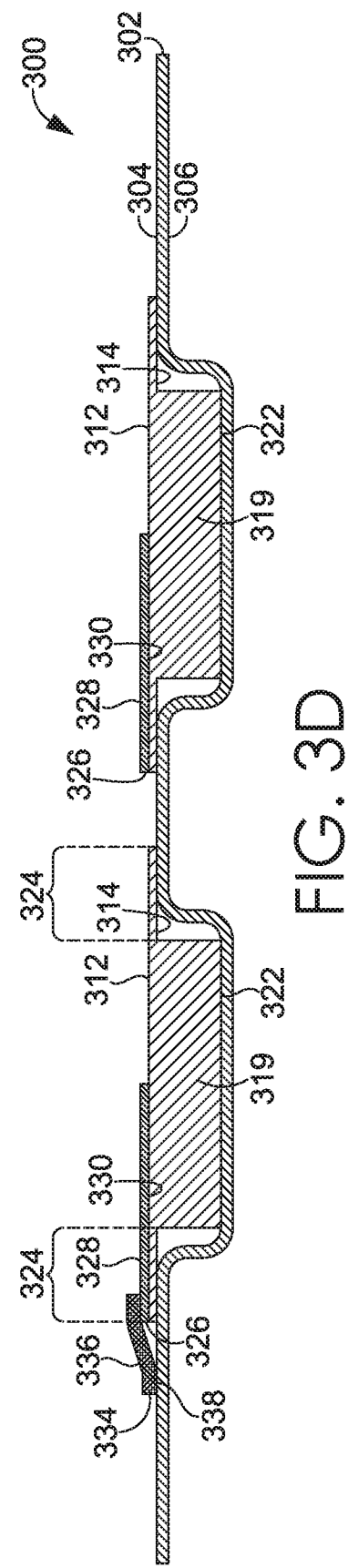

DECALS WITH DIMENSIONAL OFFSETS

CROSS-REFERENCE TO RELATED APPLICATIONS

This application entitled "Decals with Dimensional Offsets," is a Continuation Application of U.S. application Ser. No. 15/276,984, filed Sep. 27, 2016, and entitled "Decals with Dimensional Offsets" which claims priority to U.S. Prov. App. No. 62/233,886, entitled "Decals with Dimensional Offsets," and filed Sep. 28, 2015. The entireties of the aforementioned applications are incorporated by reference herein.

STATEMENT REGARDING FEDERALLY SPONSORED RESEARCH OR DEVELOPMENT

Not applicable.

TECHNICAL FIELD

The present invention is related to a decal having dimensional offsets.

BACKGROUND

Decals are often applied to garments for decorative and identification purposes. For example, an athletic jersey may have a player's name and number applied to it along with a team logo. These graphics are applied by heat transfer and are composed of non-air-permeable material. As a result, the areas of the garment on which the graphics are applied have reduced breathability and may cling to the wearer's body when the garment becomes damp.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

At a high level, aspects described herein relate to a decal having dimensional offsets. The decal is comprised of at least one layer of material including multiple dimensional offsets. The layers of material may be temporarily stored on one or more carrier sheets as a part of a kit for application onto an article, such as a shirt, pant, and/or shorts. The layers of material forming the decal having dimensional spacers may be applied to an athletic garment. When applied to the garment, the decal provides protrusions that dimensionally affect the garment. Multiple dimensional spacers may be positioned between a substrate layer forming the garment and one or more layers of overlay material that may be applied to the garment with heat, pressure, chemical bonds, mechanical bonds, and the like. The dimensional spacers of the decal displace the substrate layer such that dimensional offsets are created which reduce the amount of contact (e.g., contacting surface area) that the garment makes with a user's skin. Further, the layers of material making up the decal may be segmented so that portions of the underlying garment are exposed. This segmentation of the decal may allow for increased airflow (e.g., permeability) through the garment where the decal is placed and/or increased flexibility. This and other aspects of the present invention will be discussed in further detail in the Detailed Description.

BRIEF DESCRIPTION OF THE DRAWINGS

The present invention is described in detail herein with reference to the attached drawing figures, wherein:

FIG. 3A depicts a cross-section view of an exemplary decal applied to an article in accordance with aspects herein;

FIG. 3B depicts a cross-section view of an exemplary decal applied to an article in accordance with aspects herein;

FIG. 3C depicts a cross-section view of an exemplary decal applied to an article in accordance with aspects herein;

FIG. 3D depicts a cross-section view of an exemplary decal applied to an article in accordance with aspects herein;

DETAILED DESCRIPTION

Figure 1A:
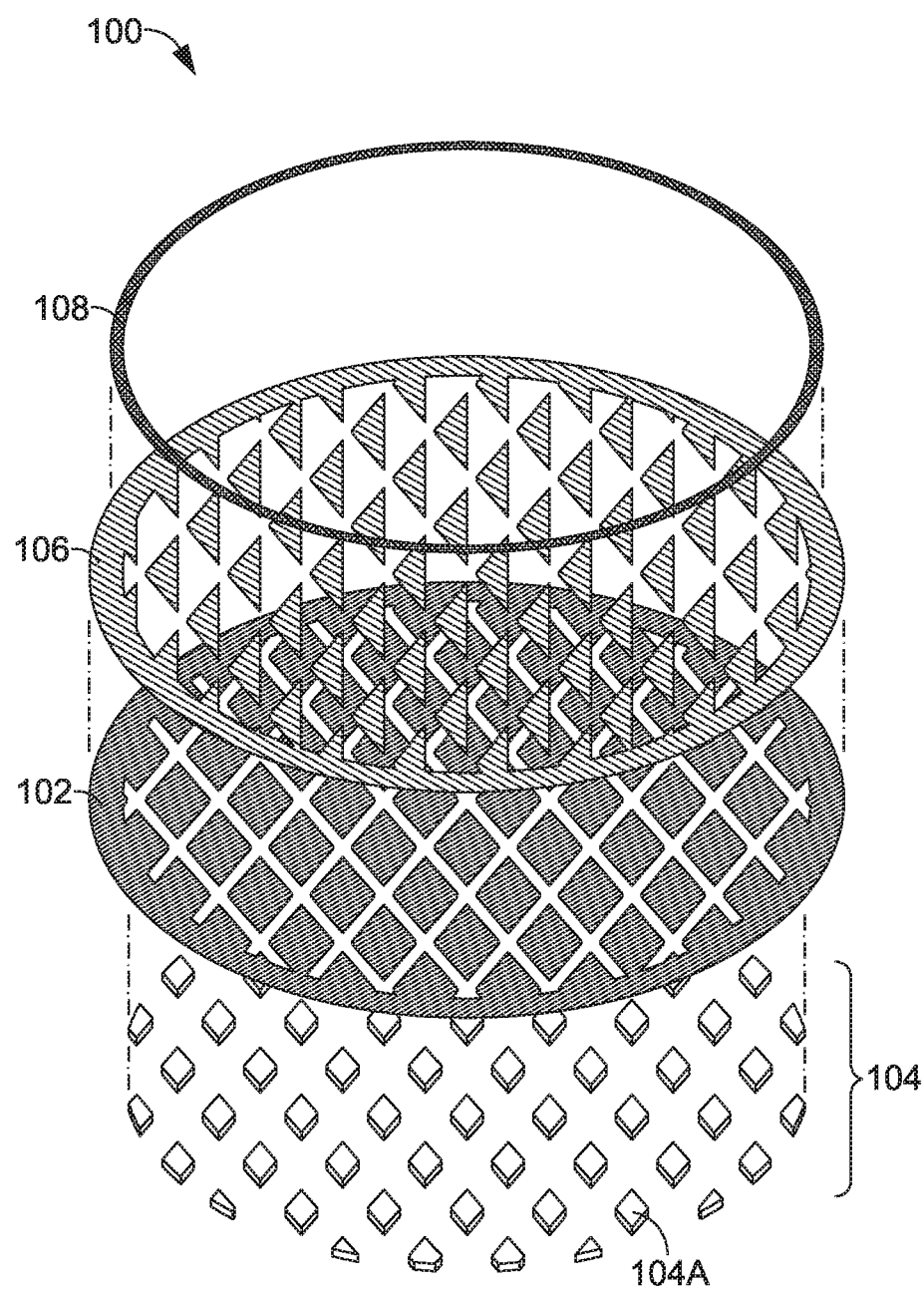
FIG. 1A depicts an exploded, perspective view of an exemplary decal in accordance with aspects herein.

Athletic uniforms have long included an indication of one or more of an athlete's name, an athlete's number, and a team's logo or identification. Over time, athletic apparel has evolved to include various technologies to enable the fabric of athletic garments to be more breathable and lightweight. This has resulted in uniforms being made of fabric that wicks moisture away from the athlete, has ventilation to allow more airflow to the athlete's skin, and has fast-drying capabilities to keep the athlete cool and dry. However, the advantages of these fabrics are hampered when a traditional solid decal or embellishment for the athlete's name, number, or team logo is applied to the uniform. Placing solid numerals on a soccer jersey, for example, may result in the soccer player experiencing greater heat retention and cling at the location where the numeral sits on the jersey. This results in discomfort for the player.

Traditional decals may be made of a variety of materials, but these materials may be continuous, such that the surface of the decal is uninterrupted and solid, and have limited air-permeability. Decals or embellishments are often applied to athletic garments using a standard heat press. The decals may originally be mounted onto carrier sheets or heat transfer paper that aids in the alignment, positioning, and orientation of portions of the decal. The decal is then placed over a uniform and the heat press is used to compress the decal onto the uniform, applying heat and pressure. A decal or embellishment may include one or more features to alleviate the problems mentioned above while still being compatible with existing application mechanisms and techniques.

First, the decal or embellishment, such as a decal having the player's number, name, or team logo, may be broken up into discontinuous and discrete portions that combine to make up a greater whole graphic. The individual portions may be interrupted by gaps allowing for air flow through the uniform fabric at the gap(s) between the individual portions of decal that would otherwise exist in a continuous decal (i.e., a decal not having discontinuous portions forming a traditional whole decal portion). The gaps allowing for air flow may also enhance the vapor permeability and/or breathability of a garment having such a decal. In addition, the spacing between the portions of decal may allow for the fabric of the garment to flex more easily, making the garment more comfortable for the athlete to wear.

Second, the decal may include offsets or three-dimensional spacers so that the fabric of the jersey or uniform that contacts the athlete's skin protrudes out (e.g., protrudes towards the user's skin) at various points where the decal is applied to the jersey or uniform. These protrusions or offsets reduce the surface area of the jersey that comes in contact with the athlete's skin, reducing the perception of cling. The effect of these offsets may be most noticeable by a user when the jersey has become damp due to sweat or other moisture. In addition, the offsets provide greater airflow by breaking up the inner surface of the garment relative to a traditional decal omitting the dimensional spacers.

Provided herein is a decal, decal kit, and article having a decal applied thereon. The decal includes a number of dimensional spacers paired to an overlay. When applied to an article, the decal creates offsets in the article. These offsets are created on an interior surface of an article to reduce the amount of contact that the article has with a user's skin, in an exemplary aspect. The decal overlay may consist of discontinuous portions of overlay material such that the decal has increased flex and breathability. It is contemplated that a decal may utilize the dimensional spacers independently on a continuous decal or in combination with a decal composed of individual, discontinuous portions of decal material. Further, while aspects provide for an offset that extends in a direction toward a user's skin (e.g., inner surface extension); it is contemplated that an exterior offset (e.g., a depression or embossment) that pulls a portion of the inner surface away from the user's skin may also be implemented.

An exemplary aspect provided herein is a decal comprising at least a first overlay and a plurality of dimensional spacers. The first overlay has a first surface and an opposite second surface with a first thickness extending between the first and second surfaces. The first overlay may provide a graphical representation of a name, number, or other identifier. The dimensional spacers each have a first spacer surface and an opposite second spacer surface with a second thickness extending between the first and second spacer surfaces. The first spacer surface of each of the dimensional spacers is adjacent to the second surface of the first overlay. The first thickness of the overlay is less than the second thickness of the dimensional spacers. The dimensional spacers have a greater resilience than the first overlay.

In another exemplary aspect, a decal kit for applying a decal having a plurality of dimensional spacers is provided. The decal kit includes a first carrier material, a first overlay, and a plurality of dimensional spacers. The first overlay has a first surface and a second surface. The first surface of the first overlay is temporarily bonded to the first carrier material. The dimensional spacers are bonded to the second surface of the first overlay.

In yet another exemplary aspect, an article is described having a decal having dimensional offsets is applied thereon. The article includes a substrate layer having a first side and a second side. A first overlay has a first side and a second side. An adhesive is applied to at least part of the second side of the first overlay to form a perimeter bond with the first side of the substrate layer. Multiple dimensional spacers are positioned between the second side of the first overlay and the first side of the substrate layer. Each dimensional spacer is aligned such that a perimeter margin of the first overlay extends beyond a perimeter of each dimensional spacer. The perimeter margin of the first overlay is coupled with the substrate layer and is effective to maintain each of the dimensional spacers in a location relative to the substrate layer.

As will be provided in greater detail hereinafter, it is contemplated that a decal providing a substrate (e.g., an article of apparel) dimensional offsets may be structured in a variety of manners. For example, it is contemplated that the decal may be comprised of a dimensional spacer positioned between the first overlay and the substrate. Alternatively, the dimensional spacers may be positioned on the side of the substrate layer opposite the first overlay. In another aspect, offsets may be created by molding a substrate and/or the first overlay that is applied thereon to form a dimensional offset. In this example of molding one or more of the materials (e.g., substrate, first overlay), it is contemplated that a dimensional spacer is not included, but instead the molded material(s) form the dimensional offset. In yet another aspect, the first overlay and the dimensional spacers may be a unitary piece of material. Any of the contemplated arrangements may be combined or used in part. For example, it is contemplated that a dimensional spacer is provided on both surfaces of a substrate and at least one of the surface also includes an overlay. Further, it is contemplated that on a common substrate one or more of the arrangements may be used to form dimensional offsets. For example, in a first portion of the substrate an integral overlay and spacer may be implemented while in a second portion of the substrate a discrete overlay and a discrete spacer combination may be implemented. The selection of various arrangements may be determined by wearability, washability, effectiveness, aesthetics, and the like as contemplated herein.

Referring now to FIG. 1A, an exploded, perspective view of an exemplary decal 100 is illustrated, in accordance with aspects hereof. The decal includes a first overlay 102, a plurality of dimensional spacers 104, a second overlay 106, and a perimeter overlay 108.

The first overlay 102 may be made of textile, fabric, plastic, vinyl, polyurethane (PU), heat transfer film, heat transfer ink, and the like. The first overlay 102 may be made of heat reactive material that bonds to other materials upon activation by energy (e.g., thermal, ultrasonic, pressure). Additionally or alternatively, adhesive may be applied to one or more surfaces of the first overlay 102. For example, the first overlay 102 may be made of PU film and PU adhesive may be applied to one or both surfaces of the PU film and/or a to-be adjoining material (e.g., substrate, spacer, additional overlay). The PU film may bond to a substrate with the PU adhesive upon activation with heat and pressure. The first overlay 102 may comprise a discontinuous pattern of individual overlay portions arranged to form an overall graphic.

For example, in FIG. 1A, the first overlay 102 forms a circle that is made of individual diamonds spaced evenly apart. As will be provided in greater detail hereinafter, a combination of discrete overlay portions may form an overall impression of an intended graphic. For example, as will be discussed with FIG. 15, a plurality of discrete overlay portions form an overall graphical appearance of the number "7." This is in contrast to traditionally discrete overlay elements, such as a separate "1" and a separate "7" forming a traditional marking of "17." In the example of a "1" and a "7" while there are discrete overlay elements forming an overall graphical impression of "17," the traditionally individual elements (i.e., the "1" and the "7") forming the overall graphical impression are not individually discontinuous and discrete. Instead, to have discontinuous and discrete overlay elements, the example of "17" would have the "1" formed from a plurality of discrete overall elements and the "7" also formed from discontinuous and discrete overlay elements. Further, it is contemplated that one or more connecting elements may join the discrete overlay elements to aid in alignment, positioning, and orientation to form the overall graphical impression of the discrete and substantially discontinuous overlay elements, in exemplary aspects.

The density of the arrangement of individual overlay portions that combine to form a graphic may be selected based upon a readability threshold. The readability threshold may be determined based upon a readability standard so that there is a maximum space that may exist between the overlay portions such that the overall graphic maintains a given level of clarity to a viewer. For example, a readability standard may be set by an athletic organization so that a referee may easily identify a player's number based upon the decal applied to the player's jersey. In other aspects, the individual overlay portions may be spaced based upon body maps which reflect how a region of the human body deforms during movement. For example, if a decal is applied on a garment at a location covering a user's joint, the decal may be broken into individual overlay portions based on how that joint moves such that movement of the user's body is not impeded. Therefore, the density, arrangement, size, and/or shape of discrete overlay portions may be changed to achieve flexibility, readability, permeability, and/or general aesthetic results.

The dimensional spacers 104 comprise three-dimensional pieces of material that exhibit the property of resilience where resilience may be defined as the ability of a material to return to its original size/shape after being deformed due to, for example, a compressive force or other types of forces. In exemplary aspects, the dimensional spaces may comprise puff ink (e.g., a plastisol expanding material), reactive foam, foam sheet, textile, laminate, thermoplastic polyurethane, and/or 3-D printed foam. Puff ink or reactive foam may be applied flat (e.g., in a non-expanded state relative to a final state of the material) and then expand upon exposure to a stimulus such as pressure, heat, chemical compositions, and the like. In alternative aspects, the dimensional spacers 104 may be comprised of material having dynamic dimensionality. For example, a dynamic dimensional material may be a gel or foam that dimensionally changes (e.g., expand) upon absorption or contact with a liquid such as sweat. An example of such a dynamic dimensional material is a superabsorbent polymer, which may also be referred to as a slush powder. In some examples, the dynamic dimensional material may return to a dimensional state when the liquid is removed (e.g., evaporated). Thus the moisture-responsive gel or foam would create dimensional spacers 104 only when wet, in this example. 3D screen printing, 2D printing, or digital printing may be used to build layers of material to form the dimensional spacers 104 directly onto another layer of the material or another material (e.g., an overlay material). Each layer may be cured before applying additional layers. The material forming the three-dimensional pieces may be individually formed (e.g., discrete elements) or formed from a larger material (e.g., cut, stamped). Cut and placed materials may include foam sheet, textile, laminate, thermoplastic polyurethane (TPU), and the like. The dimensional spacers 104 may also be formed through a casting process by either casting a three-dimensional piece of material and then applying it to the overlay material or by casting the material directly onto the overlay. Exemplary materials used for this casting process may be silicone, polyurethane, and the like. Alternatively, the dimensional spacers 104 may be formed by pouring polyurethane into a mold, flash curing, and then transferring the material onto the overlay material or substrate material and heat curing to form a bond between the overlay material and the polyurethane. The casting process may be done in layers to build the dimensional spacers 104. For example, each casting may produce a layer between 0.05 and 0.2 millimeters in height. Specifically, it is contemplated that each casting of material may generate a layer of material having a 0.1 millimeter height, in an exemplary aspect.

The dimensional spacers 104 may have a range of dimensions. In aspects, the dimensions of the dimensional spacers 104 may be in the range of 1-4 millimeters high, 3-30 millimeters long, and 2-20 millimeters wide. Stated differently, the dimensional spacers are at least 1 millimeter in height, at least 2 millimeters in width, and at least 3 millimeters in length. In aspects, the dimensions of the dimensional spacers 104 may be in the range of 2-3 millimeters high, 9-15 millimeters long, and 4-8 millimeters wide. In an exemplary aspect, the dimensions of the dimensional spacers 104 may be 2.5 millimeters high, 12.4 millimeters long, and 6 millimeters wide. The height may be the offset from the overlay surface and the length and width are measured in a plane defined by the overlay, in an exemplary aspect.

One discrete dimensional spacer 104A of the dimensional spacers 104 may be paired with each portion of the first overlay 102, in an exemplary aspect. Stated differently, it is contemplated that a single discrete dimensional spacer 104A may be paired with a single first overlay 102, in an exemplary aspect. Alternatively, some portions of the first overlay 102 (e.g., a discrete first overlay 102 portion) may not include any dimensional spacers 104 or may include multiple dimensional spacers 104. In alternative aspects, each portion of the first overlay 102 may include multiple dimensional spacers 104 of different sizes and shapes.

Additional overlays, such as the second overlay 106 and the perimeter overlay 108, may also be incorporated into the decal to provide variable properties. For example, the second overlay 106 may provide alternative abrasion properties from the first overlay 102. Alternatively, the second overlay 106 and first overlay 102 may vary in level of tackiness or grip to increase or decrease a coefficient of friction. For example, decals may be placed on portions of a garment which have an overlay having a lower coefficient of friction in order to reduce friction during player-on-player interactions. The second overlay 106 may also provide different structural effects to a decal such as stiffness, in aspects. The layering of the second overlay 106 over the first overlay 102 may provide visual effects to a garment, in some aspects. For example, the second overlay 106 may be of a different color than the first overlay 102. The second overlay 106 may include perforations or apertures created by laser cutting, such that portions of the first overlay 102 are visible through the second overlay 106. Additionally, as will be discussed hereinafter, the perimeter overlay 108 may be effective to securely bond a perimeter of the decal 100 to an underlying substrate, such as an article of clothing to resist peeling by providing a more robust transition or a continuous edge for the transition, in exemplary aspects.

FIG. 1A is merely exemplary in nature and intended to illustrate a contemplated construction of a decal having one or more overlays and one or more dimensional spacers. Alternative configurations are provided herein to illustrate a broader scope of contemplated implementations.

Figure 1B:
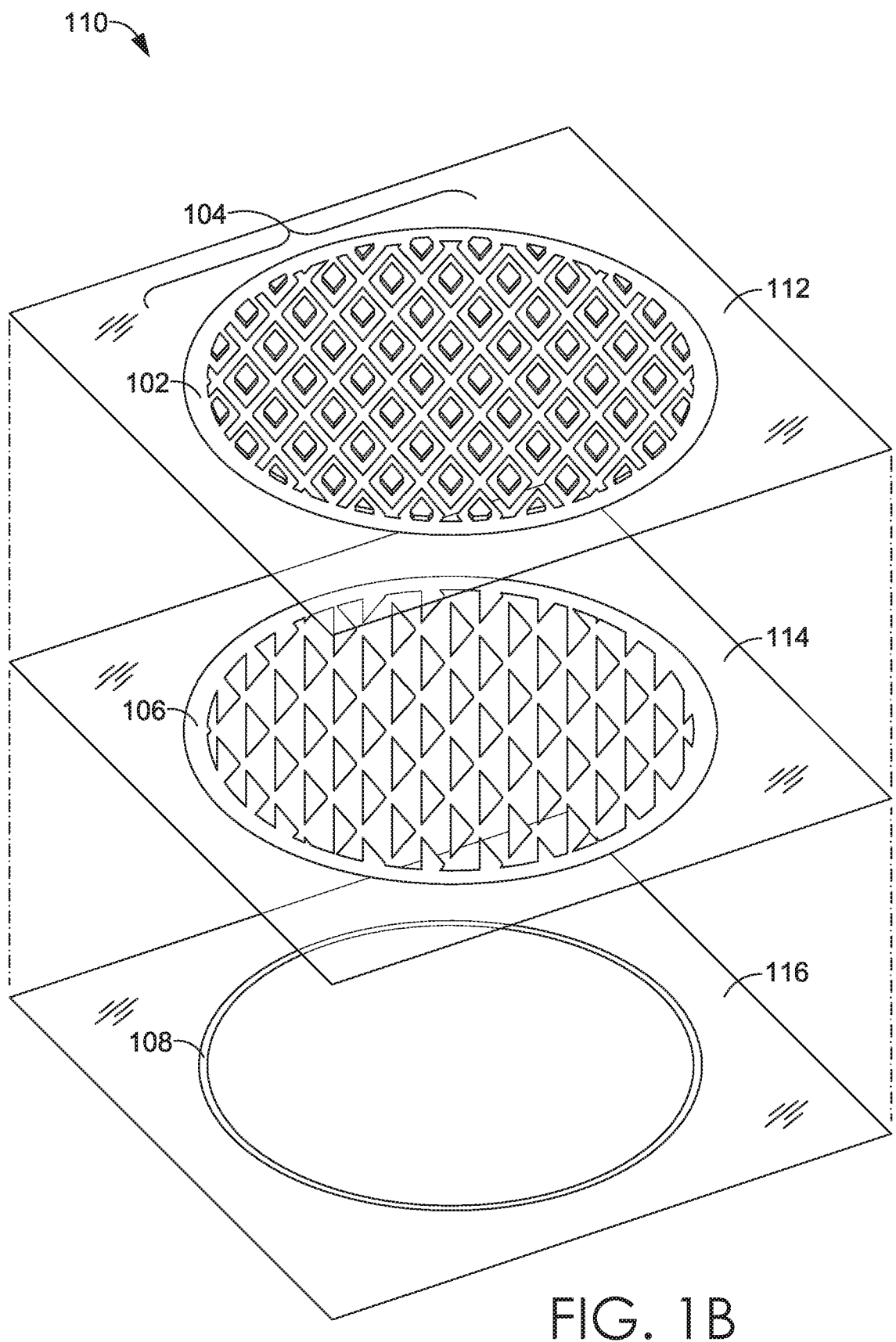
FIG. 1B depicts an exploded, perspective view of an exemplary decal kit in accordance with aspects herein.

FIG. 1B shows an exploded, perspective view of the exemplary decal of FIG. 1A as part of a decal kit 110, in accordance with aspects hereof. Here, the first overlay 102 and plurality of dimensional spacers 104 are temporarily bonded to a first carrier sheet 112. The second overlay 106 is temporarily bonded to a second carrier sheet 114, and the perimeter overlay 108 is temporarily bonded to a third carrier sheet 116. These temporary bonds may be created in various ways such as a static adhesion (e.g., an imbalance of electrical charge between materials), screen printing overlay material directly onto the carrier sheets, or use of reversible adhesives such as pressure-sensitive adhesives. In an exemplary aspect, the overlay material may be printed onto a carrier sheet one (or more) layer(s) at a time and a layer of heat-activated adhesive may also be printed, such as a final layer. Alternative temporary bonding techniques and mechanisms may be implemented in exemplary aspects.

The first carrier sheet 112, second carrier sheet 114, and third carrier sheet 116 may be made of heat transfer paper, plastic sheets, or other material suitable for temporarily maintaining one or more elements (e.g., overlay material, dimensional spacers) in a desired orientation, position, and spacing for eventual application to an article. The temporary bond may be made with an adhesive that degrades under heat. Alternatively, the adhesive may be a weak adhesive, a removable adhesive, a pressure sensitive adhesive, and the like. For example, it is contemplated that the bond between a carrier sheet and an element maintained thereon has a bonding strength that is less than a bond formed between the element temporarily maintained thereon and an article to which the element is applied. Therefore, the element separates from the carrier material instead of the article onto which the element is applied, in an exemplary aspect.

In alternative aspects, multiple overlay material may be layered and included on a single carrier sheet so that a decal may be applied to a substrate in a single step. In the example provided in FIG. 1B, the perimeter overlay 108, second overlay 106, and first overlay 102 are all aligned and stacked on top of each other on a single carrier sheet, such as the carrier sheet 116.

The optional second overlay 106 may be made of the same material as the first overlay 102 or a different material. The second overlay 106 is configured to overlap at least a portion of the first overlay 102, in the depicted arrangement. The second overlay 106 may be bonded to the first overlay 102 with an adhesive. For example, in FIG. 1A, the second overlay 106 includes a plurality of triangles and the first overlay 102 includes a plurality of diamonds. When the layers are overlapped, the triangles cover a portion of the diamonds, as shown in FIG. 1D. However, it is also contemplated that a first overlay and a second overlay do not overlap, but instead form different portions of an overall decal. For example, the first overlay in this non-overlapping example may have the dimensional spacers associated there-with while a second overlay is affixed to the underlying article without associated dimensional spacers. The second overlay 106 may include multiple layers of material built upon each other.

The optional perimeter overlay 108 may be made of the same material as the first overlay 102 and/or second overlay 106, or a different material. The perimeter overlay 108 is configured to overlap the edges of the first overlay 102 and second overlay 106, to secure the overlays to a substrate, in an exemplary aspect. The perimeter overlay 108 may have adhesive applied to a surface to bond the perimeter overlay 108 to one or more of the first overlay 102, second overlay 106, and substrate 120. However, it is also contemplated that the perimeter overlay 108, in exemplary aspects, does not overlap both the first overlay 102 and the second overlay 106. Instead, the perimeter overlay 108 may overlap only a select additional overlay or not overlap any overlays, in additional examples.

In some aspects, a kit could include a jig to aid in registering multiple layers of overlay. In aspects where offsets are formed by molding, as are discussed below with reference to FIG. 3C, the jig may also be used to register molds included in the kit.

Figure 1C:
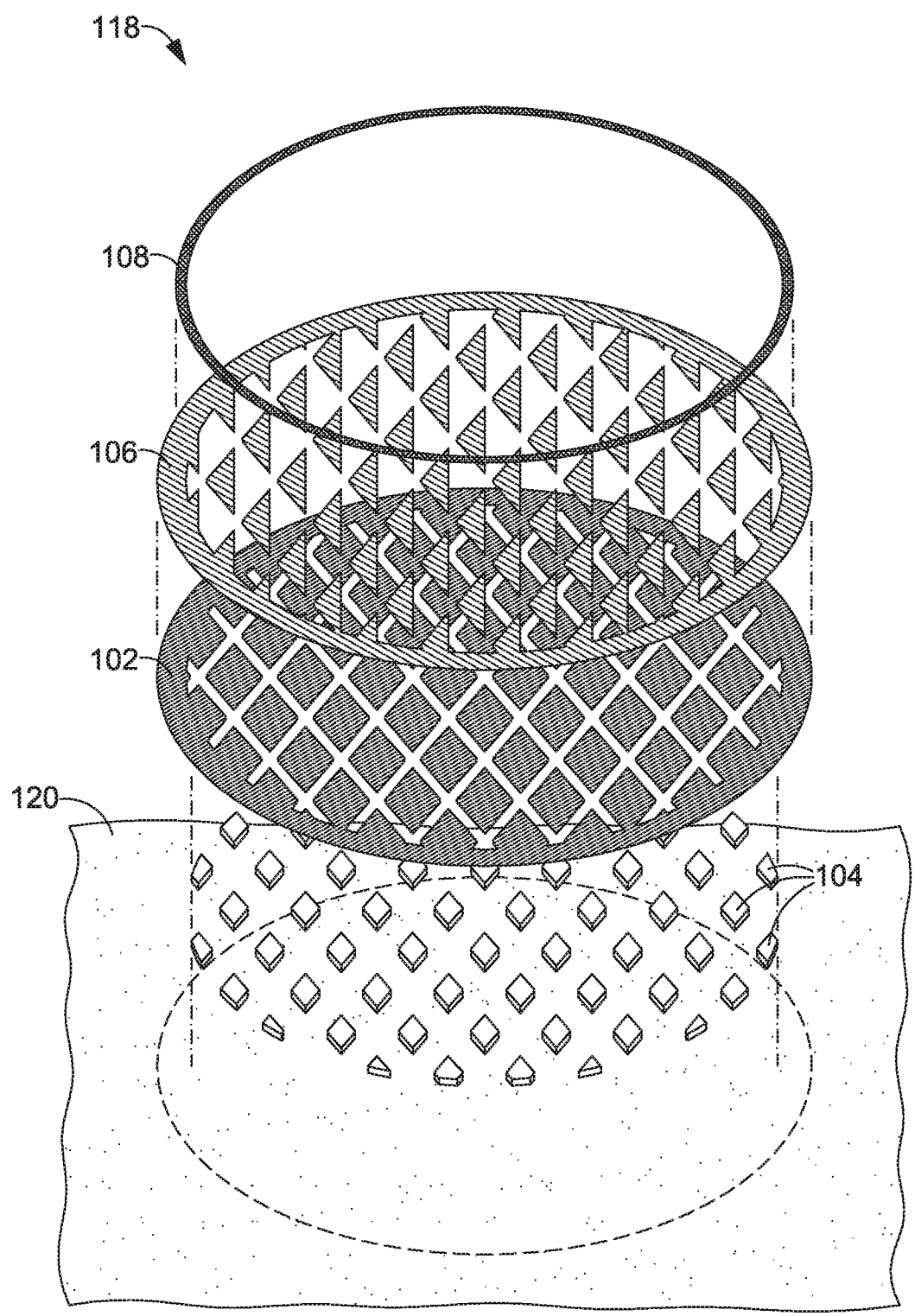
FIG. 1C depicts an exploded, perspective view of an exemplary decal applied to an article, in accordance with aspects herein.
Figure 1D:
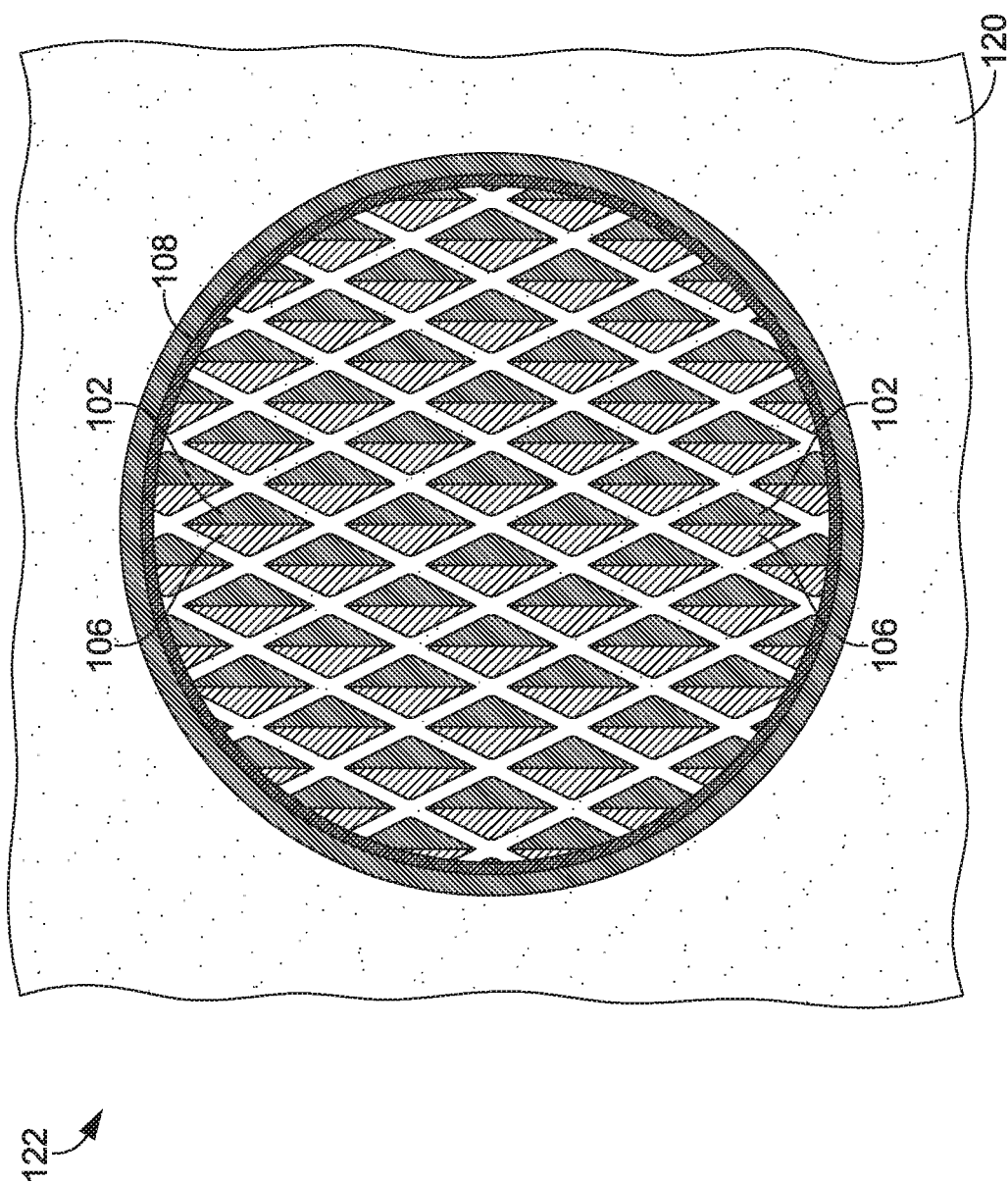
FIG. 1D depicts a top plan view of the exemplary article of FIG. 1C, in accordance with aspects herein.

An article 118 having a decal applied thereon is depicted in FIG. 1C, in accordance with aspects hereof. In this example, the decal 100 of FIG. 1A is applied to a substrate layer 120. The substrate layer 120 may be an article, such as an article of clothing (e.g., shirt, shorts, pants, jacket, jersey, singlet, socks, shoes, hat, gloves, and the like). The substrate layer 120 comprises a fabric formed from organic and/or synthetic materials. The substrate layer 120 may have a greater elasticity than the material the decal 100 is comprised of. For example, the substrate layer 120 may be knit, woven, extruded, layered, mesh, and/or sheet-like, and the like. The substrate layer 120 may be made of nylon, cotton, polyester, or any other material suitable for affixing a decal thereon. The substrate layer 120 may be breathable and permeable to moisture vapor, in exemplary aspects. The substrate layer 120 may also have wicking properties and may be constructed of a multi-density differential fabric that supports a wicking-like response to moisture.

FIG. 1D is a top plan view 122 of the article 118 of FIG. 1C, in accordance with aspects hereof. The layers shown in FIGS. 1A and 1C are shown assembled into one decal. The different layers of overlay may be utilized to create different visual effects. For example, in FIG. 1C the first overlay 102 and second overlay 106 combine to form diamonds that are a first appearance (e.g., color, texture, contrast, luminance) on one half and a second appearance on the second half. In addition to differences in color providing alternative appearances, the material of the overlays may provide structural or textural qualities. Each overlay may differ in reflectiveness, fluorescence, texture, thickness, air permeability, resistance to abrasion, and the like. Additionally or alternatively, the multiple layers of overlay may be combined to provide reinforcement, stiffness, or raised textures.

Figure 2:
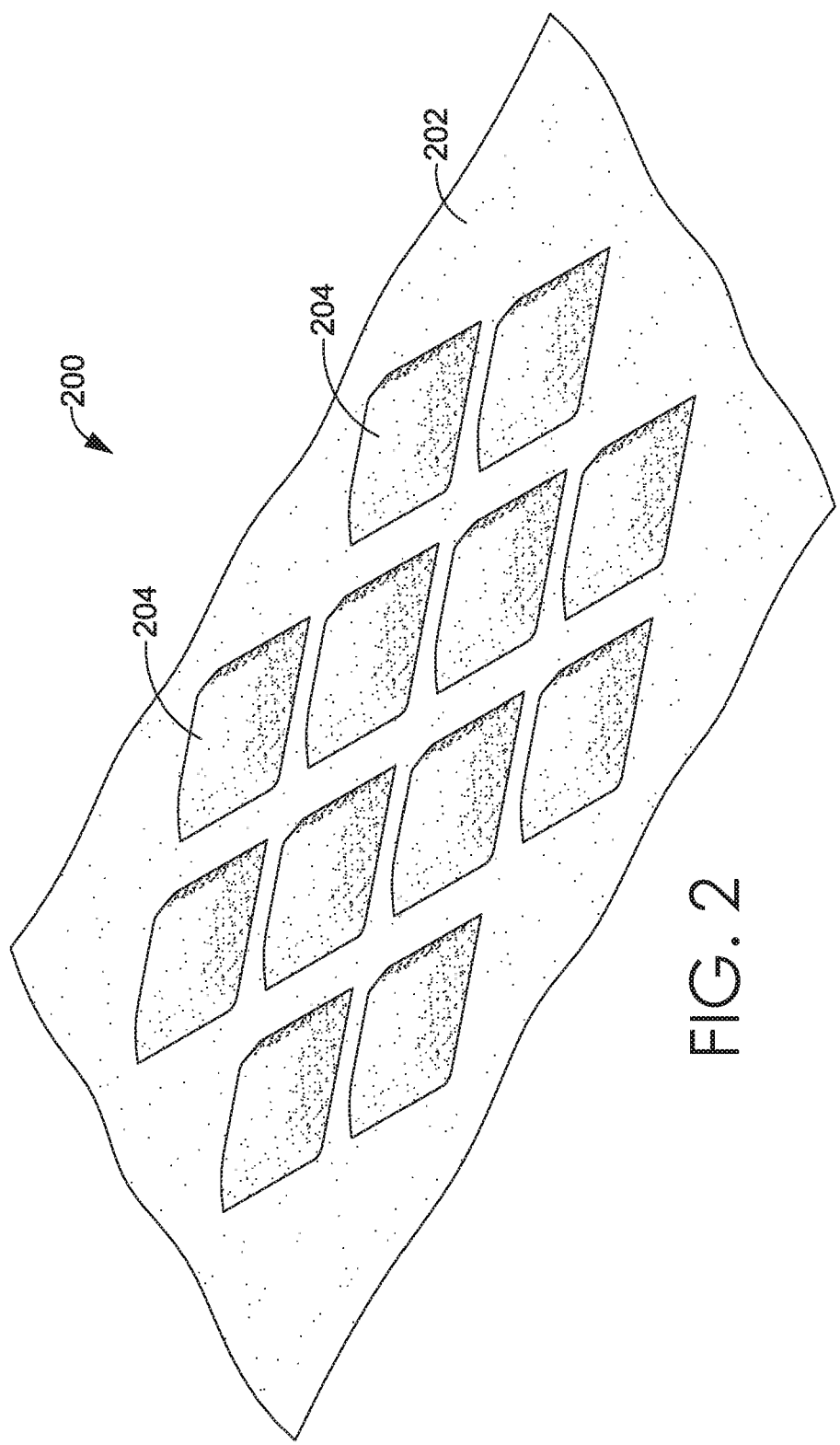
FIG. 2 depicts a bottom perspective view of an article having dimensional offsets in accordance with aspects herein.

Turning to FIG. 2, a perspective view of an article 200 is shown, in accordance with aspects hereof. This view shows the underside (e.g., a skin-facing side of an article) of the substrate layer 202. Raised offsets 204 are shown extending outward from the surface of the substrate layer 202. Here, the offsets 204 are shaped like diamonds. Other shapes and spacing of offsets 204 are possible. For example, the offsets 204 may be shaped as hemispheres, squares, triangles, ovals, rectangles, pyramids, stars, and the like. The offsets 204 may be grouped together, linearly arranged, staggered, randomly oriented, and/or continuously linked. The placement of the offsets 204 may be determined by a body heat map to achieve a determined concentration and placement of offsets relative to a human body to reduce cling of an article, air circulation, and/or moisture movement. The offsets 204 may be placed on an article in places where the article commonly clings to the body of a wearer, where body heat is greatest, and/or areas of perspiration, for example.

The offsets 204 may serve to raise the article off of the skin of a wearer. For example, the article 200 may be an athletic jersey with a decal is applied to the exterior surface. Offsets 204 are created on an interior surface of the jersey to raise the jerseys off of the skin of the jersey's wearer. This serves to create more air flow around the decal and to reduce the perception of cling at the location of the decal, in aspects. As a result, the wearer of the jersey is more comfortable, even when the jersey becomes wet with sweat or other liquid. The offsets 204 combined with a decal having discontinuous overlay portions may also serve to reduce the weight of a garment worn during physical activity by decreasing sweat absorption into the garment and by increasing the rate of evaporation of sweat off of the wearer. Additionally or alternatively, the offsets 204 may be provided on an exterior surface of a garment to provide texture effects or to modify aerodynamic properties of a garment (i.e. increasing or decreasing drag).

FIG. 3A is a cross-sectional view of an exemplary article 300 having a decal applied thereon, in accordance with aspects hereof. The article 300 includes a substrate layer 302 having a first side 304 and a second side 306. The substrate layer 302 has a first elastic modulus. The substrate layer 302 is located adjacent a first overlay 310 having a first side 312 and a second side 314. The first overlay has a second elastic modulus which is higher than the first elastic modulus of the substrate (e.g., the substrate layer 302 is more elastic than the first overlay 310). The first overlay 310 has a first thickness from 0.05 to 0.99 millimeter, in an exemplary aspect. Specifically, it is contemplated that the first thickness may be 0.1 millimeters. The first overlay may be comprised of a plurality of discontinuous portions. The discontinuous portions may be arranged into one of a number, a letter, and/or a logo.

As depicted in FIG. 3A, two (i.e., a pair of) dimensional spacers 318 are shown located between the first side 304 of the substrate layer 302 and the second side 314 of the first overlay 310. The dimensional spacers 318 have a first surface 320 and a second surface 322. The dimensional spacers 318 have a second thickness, which is greater than the first thickness of the first overlay 310. The dimensional spacers 318 are at least 1.5 millimeters, in an exemplary aspect; however, it is contemplated that the dimensional spacers are 1 millimeter to 3 millimeters in thickness. A thickness greater or smaller is also contemplated. The dimensional spacers 318 are aligned such that a perimeter margin 324 of the first overlay 310 extends beyond a perimeter of each of the dimensional spacers 318. The perimeter margin 324 of the first overlay 310 is coupled with the substrate layer 302 and is effective to maintain each of the dimensional spacers 318 in a location relative to the substrate layer 302. Because the substrate layer 302 has a lower elastic modulus than the first overlay 310, in this example, the dimensional spacers 318 protrude outward through the substrate layer 302 creating a greater offset on the second side 306 of the substrate layer 302 than on the first side 304. As mentioned above, the dimensional spacers 318 may be made of material having dynamic dimensionality. The dynamic dimensionality may be caused by a number of stimuli such as heat, light, moisture, and the like.

For example, sweat or other liquid may transfer through the substrate layer 302 and transfer the liquid to the second surface 322 of the dimensional spacer 318 from the first side 304 of the substrate layer 302. Alternatively, precipitation or other liquid may transfer through the first overlay 310 and be transferred from the second side 314 of the first overlay 310 to the first surface 320 of the dimensional spacer 318. Upon contact with the liquid, the dimensional spacer 318 may expand. However, it is contemplated that alternative relative modulus of elasticity, forming techniques, molding techniques, bonding techniques and the like may be implemented to affect the direction and degree of protrusion from the dimensional spacers, in alternative aspects.

The first surface 320 of the dimensional spacers 318 may be bonded to the second side 314 of the first overlay 310. In aspects this may be accomplished by applying adhesive to one or more of the first surface 320 of the dimensional spacers 318 and the second side 314 of the first overlay 310. The adhesive may be activated by time, light, chemicals, heat, and/or pressure. Alternatively, the second surface 322 of the dimensional spacers 318 may be bonded to the first side 304 of the substrate layer 302. Adhesive may be applied to either the second surface 322 of the dimensional spacer 318 or the first side 304 of the substrate layer 302 or both. In yet another example, the first surface 320 of the dimensional spacers 318 is bonded to the second side 314 of the first overlay 310 and the second surface 322 of the dimensional spacers 318 is bonded to the first side 304 of the substrate layer 302, so that the dimensional spacers 318 are bonded to both the substrate layer 302 and the first overlay 310 to secure the position of the dimensional spacers 318. In an alternative aspect, the dimensional spacers 318 may not be bonded on either surface. The bonding of various surfaces may be achieved by an adhesive or a bond formed between two materials (e.g., chemical and/or mechanical without a separate adhesive).

An optional second overlay 326 having a first side 328 and a second side 330 is located proximate the first overlay 310. The second overlay 326 is configured to overlap at least a portion of the first overlay 310. The second side 330 of the second overlay 326 is bonded to the first side 312 of the first overlay 310 at the portions where the second overlay 326 overlaps the first overlay 310. Adhesive may be applied to one or more of the second side 330 of the second overlay 326 and the first side 312 of the first overlay 310 to create the bond. The bonding in this example may be achieved by application of thermal energy and pressure. However, as provided herein, the bonding may be accomplished by a variety of techniques.

An optional perimeter layer 334 (also referred to as a perimeter overlay herein) is located proximate an outer edge of the second overlay 326. The perimeter layer 334 includes a first side 336 and a second side 338. The second side 338 of the perimeter layer 334 is partially bonded to the first side 328 of the second overlay 326 and is partially bonded to the first side 304 of the substrate layer 302. This may be accomplished by applying an adhesive to the second side 338 of the perimeter layer. Alternatively, adhesive may be applied to the first side 328 of the second overlay 326 and the first side 304 of the substrate layer 302. The perimeter layer 334 functions to secure the edges of the first overlay 310 and second overlay 326 to the substrate layer 302 and create a smooth border.

FIG. 3B depicts an alternative embodiment of an article 342, in accordance with aspects hereof. Here, the dimensional spacers 318 are located proximate to the second side 306 of the substrate layer 302. The first surface 320 of the dimensional spacers 318 is bonded to the second side 306 of the substrate layer 302. In this configuration, the dimensional spacers 318 would contact a user's skin when the article 342 is worn. The dimensional spacers 318 function to create offsets on the second side 306 of the substrate layer 302, which is closest to a wearer's skin when the article 342 is worn. The dimensional spacers 318 reduce the amount of contact that occurs between the article 342 and the wearer's skin, reducing the perception of cling.

FIG. 3C depicts yet another example of an article 344. Here, the article does not include dimensional spacers 318, in accordance with aspects hereof. Instead, offsets 346 are created by molding the substrate layer 302 after the first overlay 310, second overlay 326, and perimeter layer 334 have been applied. For example, the first overlay 310, second overlay 326, and perimeter layer 334 may be made of a heat reactive material. The first overlay 310, second overlay 326, and perimeter layer 334 are applied to the substrate layer 302 with a heat press. Then the article 344 having a decal applied thereon is placed in a heat mold to deform the substrate layer 302, first overlay 310, second overlay 326, and perimeter overlay 355 into a shape such that offsets 346 are created. An exemplary mold may have a top portion with protrusions and a bottom portion with corresponding indentations that mate with the protrusions (e.g., a tongue and groove mechanical engagement). An exemplary decal kit may include a disposable or reusable mold for use with a heat press to deboss and/or emboss an article in addition to applying a decal. These offsets 346 function the same as if dimensional spacers were placed in the article. The offsets 346 reduce the amount of contact that the article 344 has with a wearer's skin and allow for increased air flow where the decal is applied.

FIG. 3D depicts a cross-section view of an exemplary decal applied to an article, in accordance with aspects hereof. Instead of having a separate first overlay 310 and dimensional spacer 318 as in FIG. 3A, a unitary structure 319 creates both the overlay and the spacer. The unitary structure 319 may be formed by an additive process, such as three-dimensional printing and may be made of, for example, silicone printed in layers. Additional layers are built to form protrusions that form offsets when applied to a substrate layer 302. Alternatively, the unitary structure 319 may be molded from a single type of material. The unitary structure 319 may also be co-molded from different materials that are integrally formed into one piece. It is also contemplated that the unitary structure 319 may be formed from a reductive technique, such as milling, in exemplary aspects. The portions of the unitary structure 319 that correspond with the first overlay 310 of FIG. 3A are bonded to the substrate layer 302. In addition, the portions of the unitary structure 319 that correspond with the dimensional spacers 318 may also be bonded to the substrate layer 302.

Figure 4:
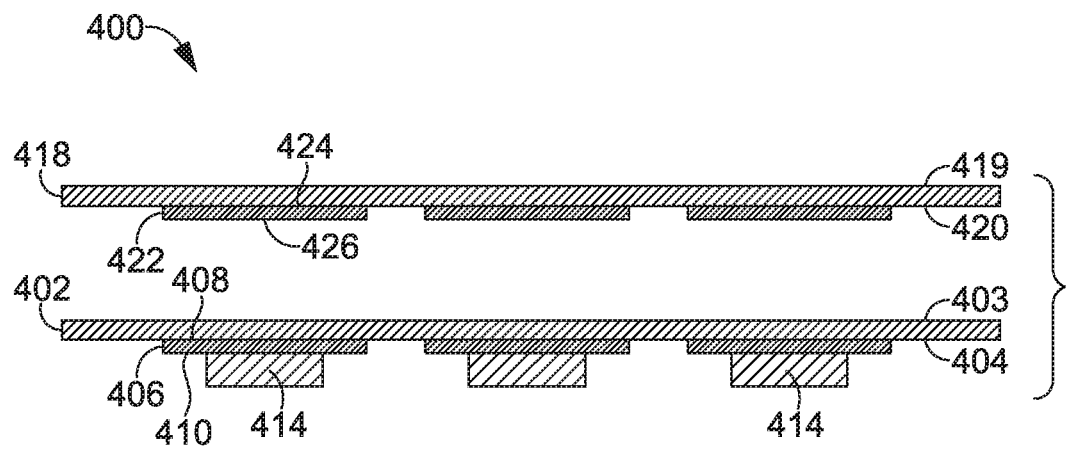
FIG. 4 depicts a cross-section view of an exemplary decal kit in accordance with aspects herein.

FIG. 4 shows a side cutaway view of an exemplary decal kit 400, in accordance with aspects hereof. A first carrier material 402 has a first surface 403 and a second surface 404. The second surface 404 of the first carrier material 402 is temporarily bonded to a first surface 408 of a first overlay 406. The temporary bond is made with a first adhesive or other interaction between the materials effective to maintain the materials, temporarily, in a set relative position. For example, a first adhesive may be applied to the second surface 404 of the first carrier material 402. Alternatively, the first adhesive may be applied to the first surface 408 of the first overlay 406. Dimensional spacers 414 are bonded to a second surface 410 of the first overlay 406. The bond between the dimensional spacers 414 and the first overlay 406 is made with a second adhesive and is permanent, in this example. However, it is contemplated that the bond between the dimensional spacers 414 and the first overlay 406 may be temporary or temporary until later converted to a permanent bond by way of an activator (e.g., thermal energy, light, pressure, and/or chemical interaction). The first overlay 406 may be made of heat activated material that bonds to an article (e.g., fabric forming an article of clothing) when heat and pressure are applied. In aspects, the first overlay 406 may be made of PU film and PU adhesive may be applied to the first surface 408 of the first overlay 406. Upon activation, such as with heat, the first surface 408 of the first overlay 406 is bonded to an article to which it is applied. For example, the first carrier material 402 can be placed over an article to which a decal is to be applied. The dimensional spacers 414 are positioned proximate the outer surface of the article. Heat and pressure are applied to the first carrier material 402 with a heat press, in an exemplary aspect. The heat press activates the first overlay 406 and a perimeter margin of the first overlay 406 bonds to the article, forming a permanent bond. The permanent bond formed between the first overlay 406 and the article is stronger than the temporary bond holding the first surface 408 of the first overlay 406 to the first carrier material 402, in this example. Therefore, once the decal is bonded to the article, the first carrier material 402 can be removed.

A second carrier material 418 has a first surface 419 and a second surface 420. The second surface 420 of the second carrier material 418 is temporarily bonded to a first surface 424 of a second overlay 422. The second surface 420 of the second overlay 422 is located proximate the first surface 403 of the first carrier material 402. The second surface 420 of the second overlay 422 may be configured to extend over at least a portion of the first surface 408 of the first overlay 406.

Similar to the first carrier material 402 and first overlay 406, the temporary bond may be made with an adhesive that is less strong than the bond made between the second overlay 422 and the first overlay 406. This allows the second overlay 422 to be applied to an article already having a first overlay 406 applied, activating an adhesive of the second overlay 422 with heat, and then removing the second carrier material 418.

The decal kit 400 may be designed to be compatible with existing heat press machines in use with traditional decals not having dimensional spacers. Alternatively, modifications to existing equipment may be required. First, the first carrier material 402 is applied to a substrate with the dimensional spacers 414 facing the substrate. Heat and pressure are applied to bond the first overlay 406 and dimensional spacers 414 to the substrate. Then, the second carrier material 418 is applied over the first overlay 406 and substrate so that the second overlay 422 contacts the first overlay 406. Heat and pressure are applied to bond the second overlay 422 to the first overlay 406. Alternatively, the first overlay 406, dimensional spacers 414, and second overlay 422 may all be temporarily bonded onto a single carrier sheet. Such a carrier sheet would allow for application of the decal to an article in a single step. While a heat press is described, it is contemplated that alternative mechanisms may be implemented to achieve a securing of one or more materials to one or more additional materials. For example, decal materials may be applied with physical pressure, application of steam, passing the materials through a curing oven, and the like.

Figures 5A, 5B, 5C:
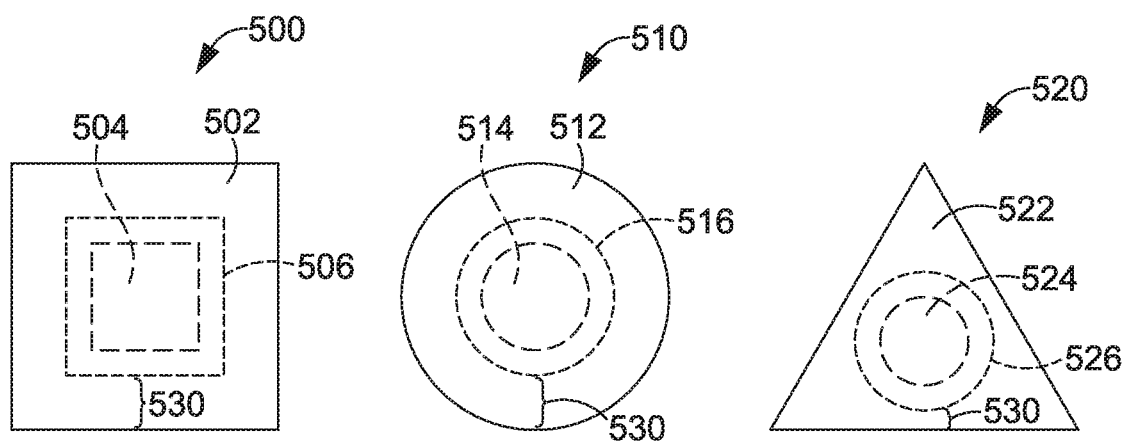
FIG. 5A depicts a top plan view of an exemplary overlay portion of a decal in accordance with aspects herein.
FIG. 5B depicts a top plan view of an exemplary overlay portion of a decal in accordance with aspects herein.
FIG. 5C depicts a top plan view of an exemplary overlay portion of a decal in accordance with aspects herein.

FIGS. 5A-5C illustrate various illustrative, but non-limiting, embodiments of portions of overlay material covering dimensional spacers, in accordance with aspects hereof. FIG. 5A shows a top plan view 500 of a square overlay portion 502. This square overlay portion 502 is placed over a square dimensional spacer 504, indicated by long dashed lines. The square overlay portion 502 has a perimeter margin which extends beyond a perimeter of the dimensional spacer 504. The perimeter margin is large enough to allow the overlay portion to securely bond to a substrate layer. In aspects, the perimeter margin extends beyond the perimeter of the dimensional spacer 504 at least 1 millimeter, or at least 2 millimeters. In alternative aspects, the overlay portion is at least equal to the thickness of the dimensional spacer, in an exemplary aspect.

The example of FIG. 5A illustrates an overlay portion 502 being paired with a dimensional spacer 504 of a corresponding shape. The short dashed lines indicate a perimeter bond 506 that is formed when the square overlay portion 502 is bonded to a substrate layer (not shown). The perimeter bond 506 may be a continuous bond completely encapsulating the dimensional spacer 504. Alternatively, the perimeter bond 506 may discontinuous such that the dimensional spacer 504 is not completely encapsulated between the substrate layer and the overlay portion 502, but there are sufficient contacts between the substrate layer and the overlay portion 502 to retain the dimensional spacer 504 at a particular location on an article. For example, the perimeter bond 506 could consist of separate bonds made at each of the four corners of the perimeter. In another example, the perimeter bond 506 could consist of separate bonds made in the center of each of the four sides of the square perimeter.

FIG. 5B illustrates an example of a circle overlay portion 510. The circle overlay portion 510 covers a round dimensional spacer 514, creating a perimeter bond 516. The perimeter bond 516 may be a continuous bond completely encapsulating the round dimensional spacer 514 or the perimeter bond 516 may consist of multiple individual bonds located around the circular perimeter of the circle overlay portion 510.

FIG. 5C illustrates a triangle overlay portion 520 securing a round dimensional spacer 524 at a perimeter bond 526. This example illustrates the triangle overlay portion 520 being paired with a round dimensional spacer 524 having a non-corresponding shape.

As can be seen from the examples of overlay portions and dimensional spacers depicted in FIGS. 5A-5C, the overlay portions which make up the overlay of a decal may be of various shapes. The shape of the dimensional spacers may correspond with the shape of the overlay portion or the dimensional spacers may be of a different shape than the overlay portion. A perimeter margin 530 of each overlay portion may extend beyond each dimensional spacer so that the overlay portion can be bonded to a substrate at a perimeter bond. The perimeter margin 530 extends at least 1 millimeter beyond the dimensional spacer in all directions in an exemplary aspect. Alternatively, the perimeter margin 530 extends at least 1 millimeter beyond the dimensional spacer in at least one direction, in another exemplary aspect. The perimeter margin 530 may extend 1 millimeter to 5 millimeters beyond the dimensional spacer. In other aspects the perimeter margin 530 may extend less than 1 millimeter or more than 5 millimeters beyond the dimensional spacer. This extension of the margin may ensure that the overlay portion is securely bonded to the substrate and that the dimensional spacers are secured in a fixed location.

Figure 6A:
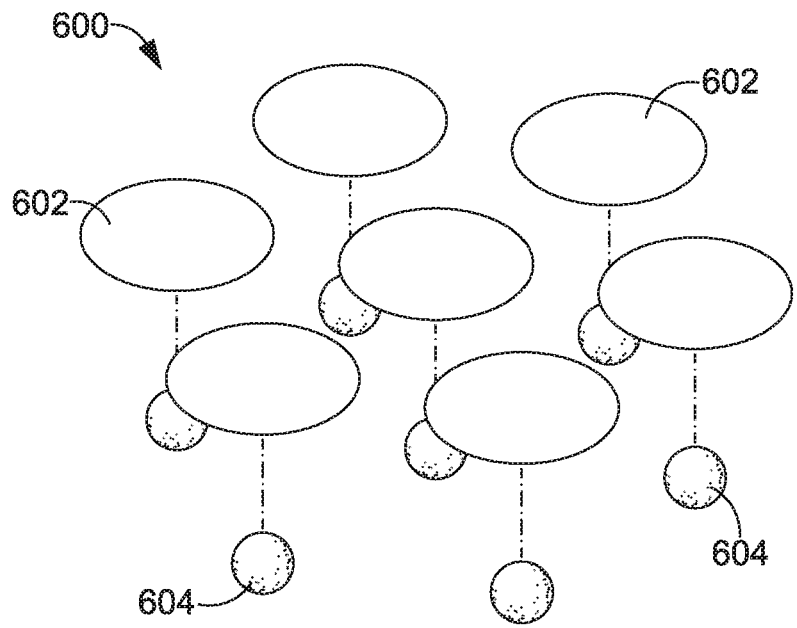
FIG. 6A depicts an exploded, perspective view of overlay portions and dimensional spacers of a decal in accordance with aspects herein.

Turning to FIG. 6A, an alternative example of circular overlay portions 602 is shown in an exploded view 600, in accordance with aspects hereof. Each circular overlay portion 602 is configured to pair with each spherical dimensional spacer 604. The spherical dimensional spacer 604 may be comprised of 3-D printed foam, puff ink, reactive foam, or other suitable dimensional material. The puff ink or reactive foam may be activated by heat, microwave radiation, ultraviolet radiation, infrared light, radio waves, steam, and the like. In alternative aspect, the puff ink or reactive foam may have dynamic dimensionality such that the ink or foam expands upon contact with liquid and/or dimensionally retracts when dry. The spherical dimensional spacer 604 may be formed separate from the circular overlay portion 602 or may be applied directly to the circular overlay portion 602, for example, by digital printing. The spherical dimensional spacer 604 may be effective to provide a variable compression resistance while minimizing a contact area of the offset on the formed article. This may be effective to maintain a minimal contact area that adjusts based on a level of compression applied to the article about a user's body, in an exemplary aspect. Other shapes may be implemented to achieve a similar result, such as a conical structure, a pyramid structure, or other graduated volume shape, in exemplary aspects.

Figure 6B:
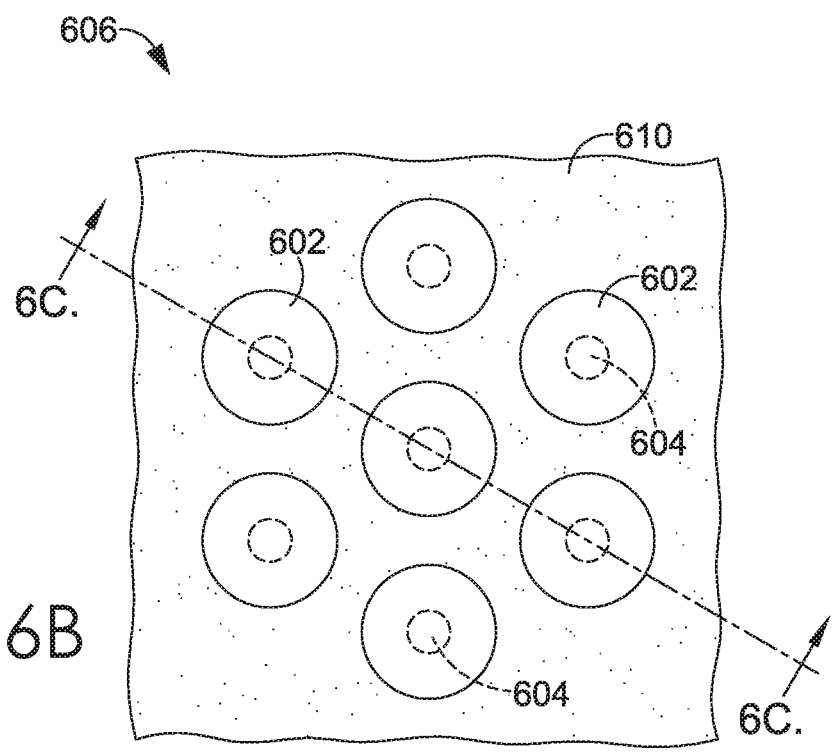
FIG. 6B depicts a top plan view of overlay portions and dimensional spacers of a decal applied to an article in accordance with aspects herein.

FIG. 6B shows a top plan view of the circular overlay portions 602 and spherical dimensional spacers 604 of FIG. 6A applied to a substrate layer 610 to form an article 606. A cutline 6C is depicted to illustrate a cross section of FIG. 6C hereinafter. Each circular overlay portion 602 is bonded to the substrate layer 610, creating a perimeter bond around each spherical dimensional spacer 604.

Figure 6C:
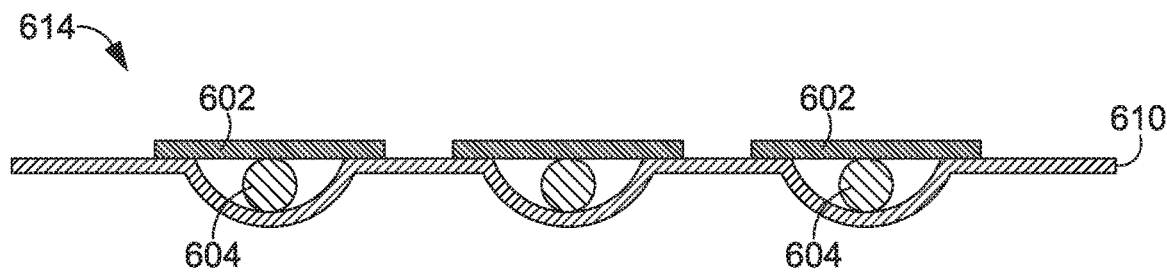
FIG. 6C depicts a cross-sectional view of overlay portions and dimensional spacers of a decal applied to an article in accordance with aspects herein.
Figure 6D:
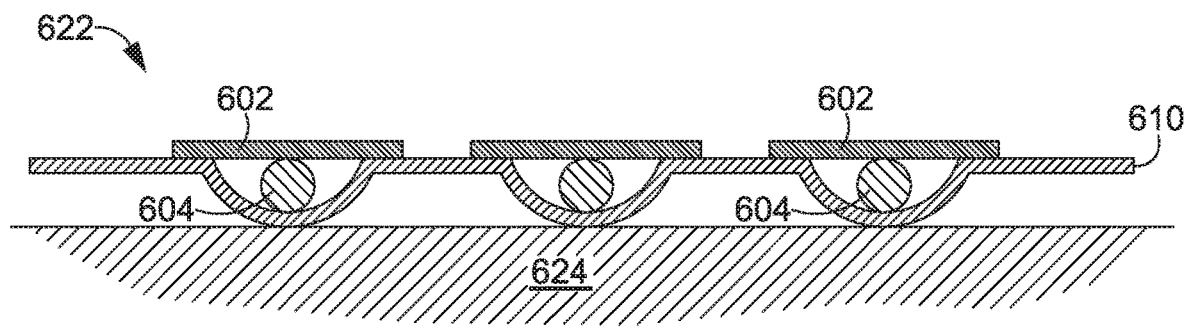
FIG. 6D depicts a cross-sectional view of overlay portions and dimensional spacers of a decal applied to an article being worn by a user in accordance with aspects herein.

FIG. 6C shows a cross sectional view 614 of the article 606 of FIG. 6B. FIG. 6D shows a cross sectional view 615 of the article 606 of FIG. 6B shown in relation to a user's skin 624. The substrate layer 610 rests adjacent to the user's skin 624. The spherical dimensional spacers 604 are positioned between the substrate layer 610 and the circular overlay portions 602. Therefore, the circular overlay portions 602 are positioned on the exterior side of the substrate layer 610, facing away from the user's skin 624, in this depicted example.

Figure 6E:
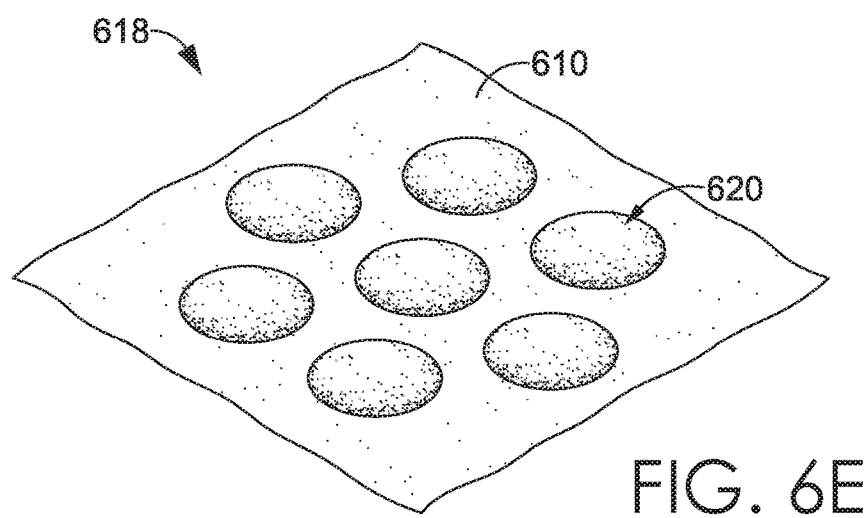
FIG. 6E depicts a bottom perspective view of dimensional offsets created by overlay portions and dimensional spacers of a decal applied to an article in accordance with aspects herein.

A bottom perspective view 618 of the article 606 of FIG. 6B is shown in FIG. 6E. This is a view of the surface of the substrate layer 610 which would contact a user's skin. The dimensional spacers (not visible) displace the substrate layer 610 at positions where overlay portions are bonded to the substrate layer 610. This creates offsets 620, reducing the amount of contact that is made between the article and the user's skin 624. Alternatively, as mentioned above, the dimensional spacers may be positioned on an interior surface of a garment such that the substrate layer 610 protrudes out and away from a user's skin creating offsets 620 on the exterior of a garment.

FIGS. 7A-11C illustrate various embodiments of overlay portions paired with dimensional spacers. As with FIGS. 5A-5C, these examples illustrate that the overlay portions and dimensional spacers may be of any shape, size, and relative orientation. The overlay portion and the dimensional spacer may be of corresponding or non-corresponding shapes. As long as the overlay portion extends at least 1 millimeter, in an exemplary aspect, beyond the dimensional spacer, the overlay portion may be bonded to a substrate, securing the dimensional spacer to a location on the substrate. A perimeter margin of a minimum width may ensure that an overlay portion will remain bonded to a substrate through wear and tear from normal use and repeated washing. As previously provided, alternative minimum overlay distances are contemplated, such as a distance equal to a thickness of the dimensional spacer, for example.

Figure 7A:
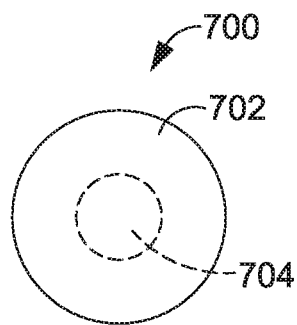
FIG. 7A depicts a top plan view of an exemplary overlay portion and dimensional spacer of a decal in accordance with aspects herein.
Figure 7B:
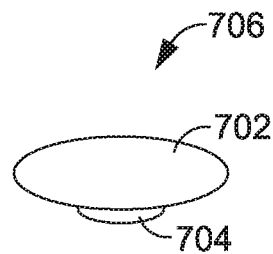
FIG. 7B depicts a perspective view of an exemplary overlay portion and dimensional spacer of a decal in accordance with aspects herein.
Figure 7C:
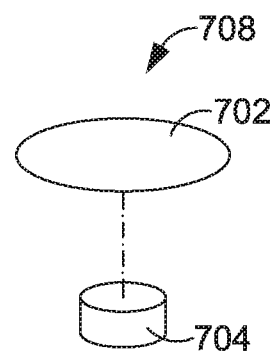
FIG. 7C depicts an exploded, perspective view of an exemplary overlay portion and dimensional spacer of a decal in accordance with aspects herein.

A top plan view 700 of a circular overlay portion 702 is illustrated in FIG. 7A, in accordance with aspects hereof. This circular overlay portion 702 is paired with a cylindrical dimensional spacer 704, indicated by a dotted line. FIG. 7B illustrates the circular overlay portion 702 paired with the cylindrical dimensional spacer 704 in a perspective view 706, in accordance with aspects hereof. FIG. 7C is an exploded view of the circular overlay portion 702 and the cylindrical dimensional spacer 704, in accordance with aspects hereof. This is an example of an overlay portion corresponding in shape to a dimensional spacer.

Figure 8A:
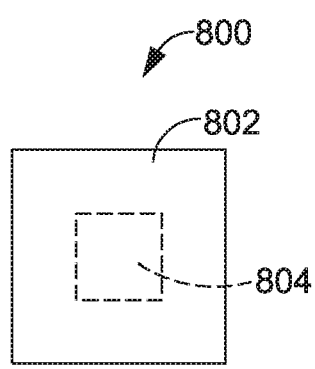
FIG. 8A depicts a top plan view of an exemplary overlay portion and dimensional spacer of a decal in accordance with aspects herein.
Figure 8B:
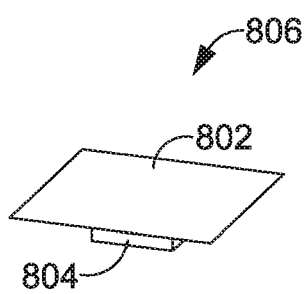
FIG. 8B depicts a perspective view of an exemplary overlay portion and dimensional spacer of a decal in accordance with aspects herein.
Figure 8C:
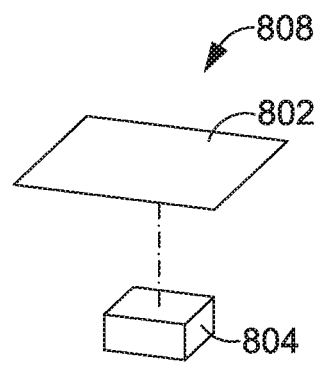
FIG. 8C depicts an exploded, perspective view of an exemplary overlay portion and dimensional spacer of a decal in accordance with aspects herein.

FIGS. 8A-8C illustrate a square overlay portion 802 paired with a rectangular cuboid dimensional spacer 804, in accordance with aspects hereof. The overlay portion 802 and rectangular cuboid dimensional spacer 804 are shown in a top plan view 800 in FIG. 8A. FIG. 8B depicts a perspective view 806 of the overlay portion 802 and rectangular cuboid dimensional spacer 804. Finally, an exploded view 808 is shown in FIG. 8C.

Figure 9A:
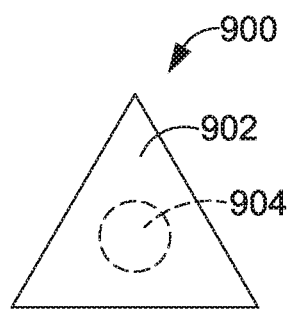
FIG. 9A depicts a top plan view of an exemplary overlay portion and dimensional spacer of a decal in accordance with aspects herein.
Figure 9B:
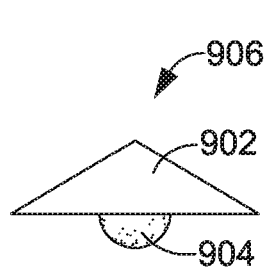
FIG. 9B depicts a perspective view of an exemplary overlay portion and dimensional spacer of a decal in accordance with aspects herein.
Figure 9C:
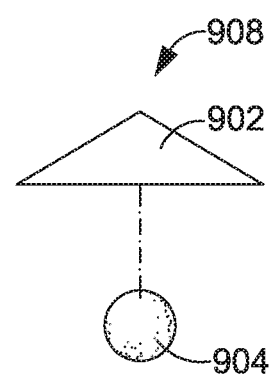
FIG. 9C depicts an exploded, perspective view of an exemplary overlay portion and dimensional spacer of a decal in accordance with aspects herein.

FIGS. 9A-9C depict an example of a triangular overlay portion 902 paired with a spherical dimensional spacer 904, in accordance with aspects hereof. A top plan view 900 of the triangular overlay portion 902 and spherical dimensional spacer 904 (indicated by dotted line) are shown in FIG. 9A. FIG. 9B shows a perspective view 906 and FIG. 9C shows an exploded view 908 of the triangular overlay portion 902 and spherical dimensional spacer 904. This is an example of an overlay portion which does not correspond in shape to a dimensional spacer.

Figure 10A:
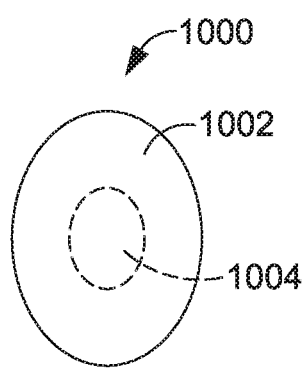
FIG. 10A depicts a top plan view of an exemplary overlay portion and dimensional spacer of a decal in accordance with aspects herein.
Figure 10B:
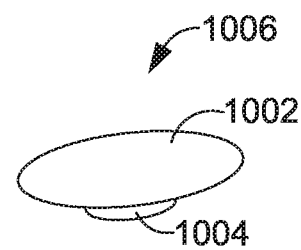
FIG. 10B depicts a perspective view of an exemplary overlay portion and dimensional spacer of a decal in accordance with aspects herein.
Figure 10C:
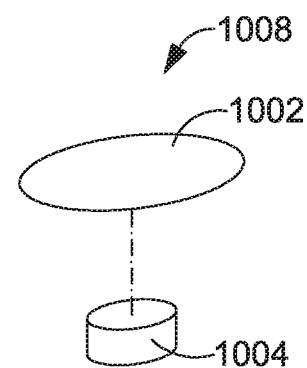
FIG. 10C depicts an exploded, perspective view of an exemplary overlay portion and dimensional spacer of a decal in accordance with aspects herein.

FIGS. 10A-10C illustrate an oval overlay portion 1002 paired with an elliptic cylinder dimensional spacer 1004, in accordance with aspects hereof. A top plan view 1000 is shown in FIG. 10A, a perspective view 1006 is shown in FIG. 10B, and an exploded view 1008 is shown in FIG. 10C.

Figure 11A:
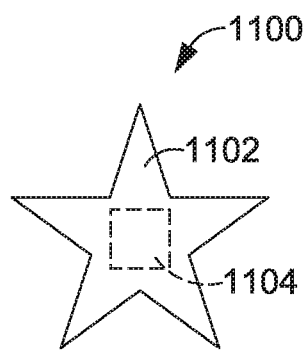
FIG. 11A depicts a top plan view of an exemplary overlay portion and dimensional spacer of a decal in accordance with aspects herein.
Figure 11B:
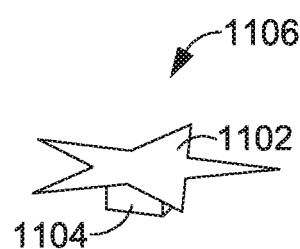
FIG. 11B depicts a perspective view of an exemplary overlay portion and dimensional spacer of a decal in accordance with aspects herein.
Figure 11C:
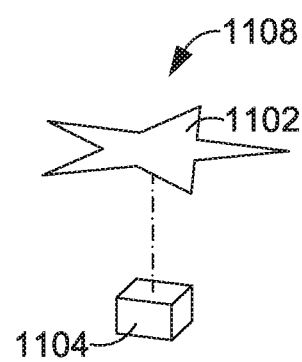
FIG. 11C depicts an exploded, perspective view of an exemplary overlay portion and dimensional spacer of a decal in accordance with aspects herein.

FIGS. 11A-11C illustrate a star-shaped overlay portion 1102 paired with a rectangular cuboid dimensional spacer 1104, in accordance with aspects hereof. A top plan view 1100 is shown in FIG. 11A, a perspective view 1106 is shown in FIG. 11B, and an exploded view 1108 is shown in FIG. 11C.

Figure 12:
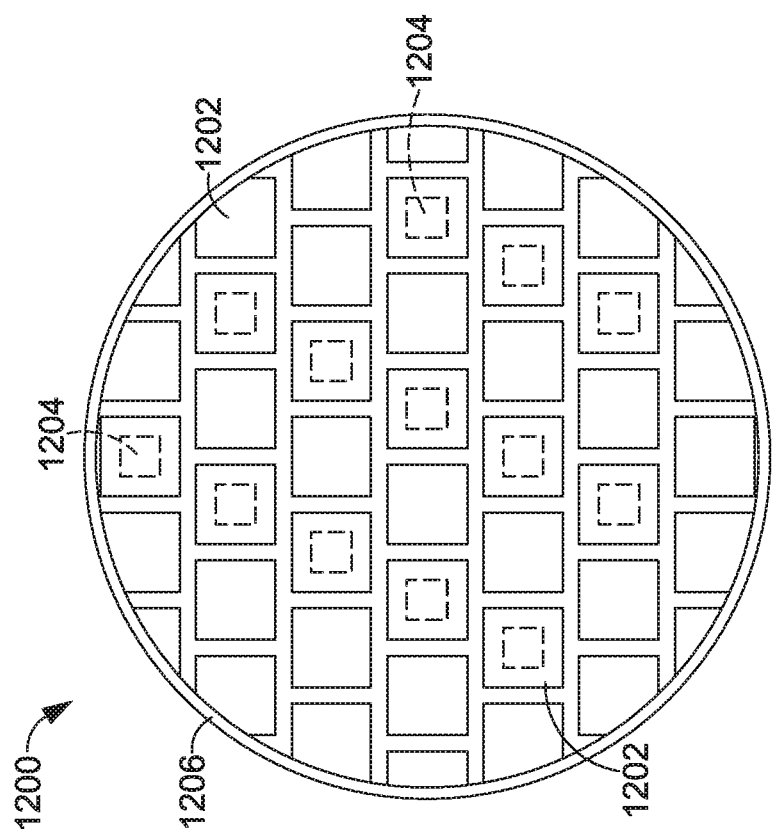
FIG. 12 depicts a top plan view of an exemplary decal in accordance with aspects herein.

Referring now to FIG. 12, another example of a decal 1200 is shown in a top plan view, in accordance with aspects hereof. An overlay is comprised of multiple square overlay portions 1202. These overlay portions 1202 are spaced evenly to form an overall circle shape. The discontinuous arrangement of the overlay portions 1202 allows for an underlying substrate to flex more easily and allows for greater airflow through the substrate. The spacing of the overlay portions 1202 may be adjusted for aesthetic or functional purposes. For example, the overlay portions 1202 may be arranged to create a visual pattern. Alternatively, the overlay portions 1202 may be arranged so that the spaces between the portions align with areas on a garment that typically flex as a wearer moves. The overlay portions 1202 may be arranged according to body maps (e.g. heat maps, temperature maps, sweat maps, deformation maps) or based upon readability.

Square dimensional spacers 1204, indicated by dotted lines, are positioned under the square overlay portions 1202. The dimensional spacers 1204 may be positioned under every overlay portion 1202 or may be positioned under only a subset of the overlay portions 1202. The subset of overlay portions 1202 may be selected based on forming a visual pattern or by functional concerns based on locations of a garment which experience more cling on a wearer's body.

The overlay portions 1202 are bounded by an optional perimeter layer 1206. The perimeter layer 1206 may be made of the same material as the overlay portions 1202 or different material. The perimeter layer 1206 functions to secure the edges of the overlay portions 1202 at a border to an article. The perimeter layer 1206 may help to smooth the texture of the decal around its border and may prevent edges of the overlay portions 1202 at the border of the decal from peeling from an article.

Figure 13:
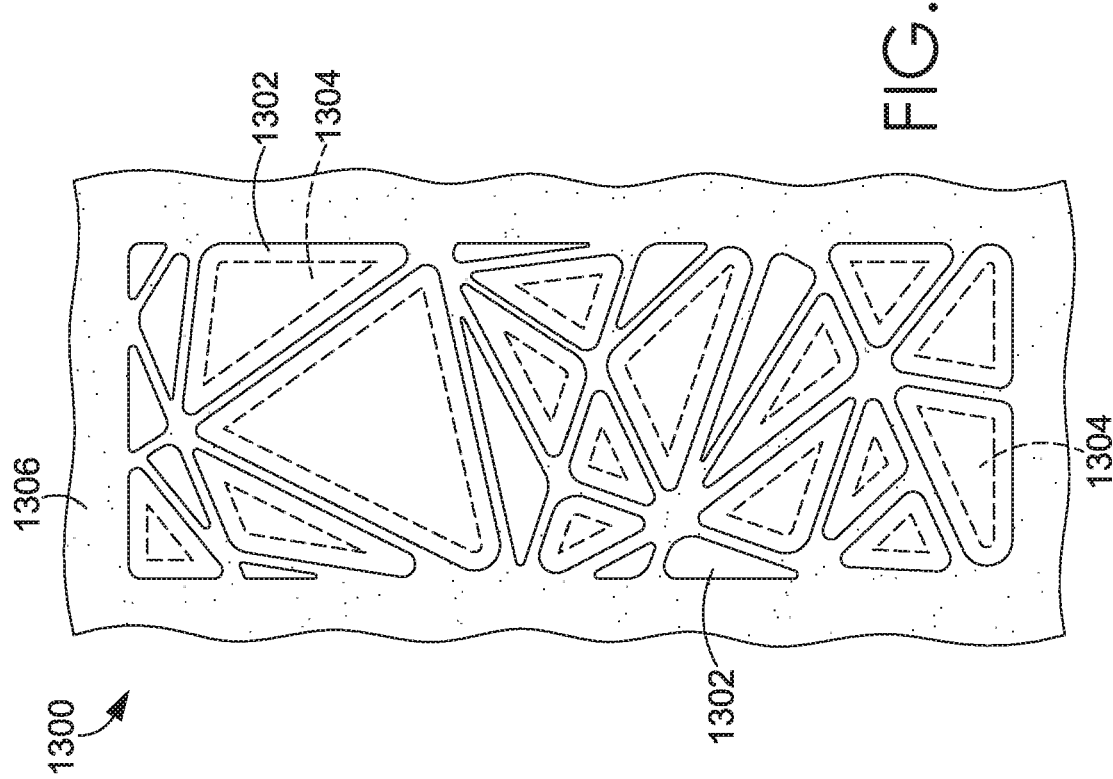
FIG. 13 depicts a top plan view of an exemplary decal applied to an article in accordance with aspects herein.

FIG. 13 illustrates another example of a decal applied to an article 1300 in a top plan view, in accordance with aspects hereof. Multiple discrete triangular overlay portions 1302 are arranged together in one cohesive overlay applied to a substrate layer 1306. The larger triangular overlay portions 1302 are paired with smaller, similarly shaped dimensional offsets 1304, indicated by dotted lines. As mentioned before, a perimeter margin of at least 1 millimeter of the triangular overlay portions 1302 extends beyond each of the dimensional offsets 1304. Here, some of the triangular overlay portions 1302 are too small to allow a perimeter margin of a determined minimum. Therefore, these triangular overlay portions 1302 are not paired with the dimensional offsets 1304.

There may be a perimeter margin of greater than 1 millimeter. For example, a dimensional offset may be significantly smaller than an overlay portion that it is paired with such that there is over 3 millimeters of overlay material extending beyond the dimensional offset. This will result in greater contact area between the overlay portion and an underlying article to which the decal is applied. In another embodiment, one overlay portion may be paired with multiple dimensional spacers. For instance, one large overlay portion may be paired with five small circular dimensional spacers. The circular dimensional spacers may be spaced so that one spacer is positioned in the center of the overlay portion and each of the remaining four spacers are positioned in each of the four corners of the square overlay portion so that at least 1 millimeter of an overlay margin extends beyond the spacers.

Figure 14:
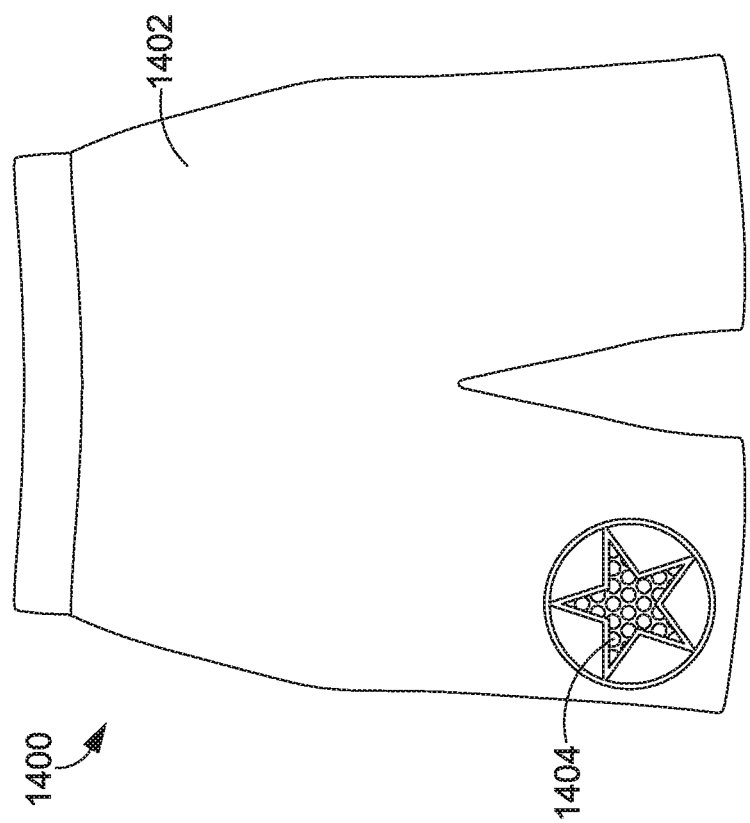
FIG. 14 depicts a top plan view of an exemplary decal applied to a pair of shorts in accordance with aspects herein.

FIG. 14 illustrates a plan view 1400 of a pair of athletic shorts 1402 with a decal 1404 applied thereon, in accordance with aspects hereof. The decal 1404 is a logo featuring discontinuous portions of overlay in the shape of circles which are bordered by a perimeter overlay shaped like a star within a circle. Dimensional spacers (not visible) provide offsets that reduce cling of the shorts to a wearer's thigh.

Figure 15:
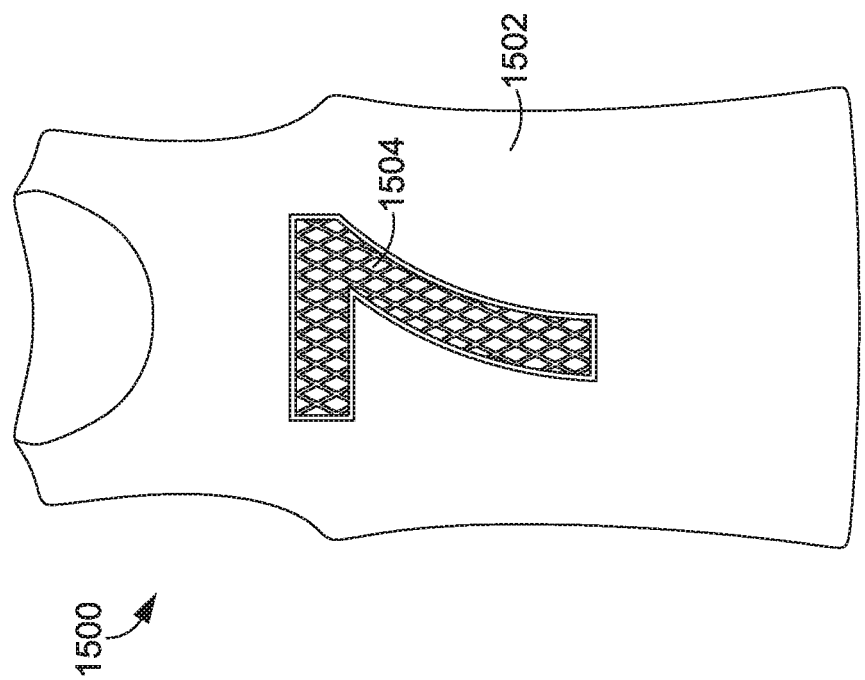
FIG. 15 depicts a top plan view of an exemplary decal applied to a jersey in accordance with aspects herein.

FIG. 15 illustrates a plan view 1500 of an athletic jersey 1502 with a decal 1504 applied thereon, in accordance with aspects hereof. The decal 1504 is a player's number of "7" which is composed of multiple diamond overlay portions. A perimeter overlay borders the "7" shape. Dimensional spacers (not visible) provide offsets that reduce cling of the shorts to a wearer's torso.

The present invention has been described in relation to particular examples, which are intended in all respects to be illustrative rather than restrictive. Alternative embodiments will become apparent to those of ordinary skill in the art to which the present invention pertains without departing from its scope. Certain features and subcombinations are of utility and may be employed without reference to other features and subcombinations and are contemplated within the scope of the claims.

What is claimed is:

1. An article of apparel comprising:
   a substrate layer that forms the article of apparel, the substrate layer having an inner-facing side and an opposite outer-facing side;
   a first overlay comprising a first plurality of discrete overlay portions each having a first edge and an opposite second edge, a first surface and an opposite second surface, the second surface of each of the first plurality of discrete overlay portions secured to the outer-facing side of the substrate layer;
   a second overlay comprising a second plurality of discrete overlay portions each having a first edge and an opposite second edge, a first surface and an opposite second surface, wherein the second surface of at least a portion of the second plurality of discrete overlay portions is secured adjacent to the first surface of at least a portion of the first plurality of discrete overlay portions of the first overlay, and wherein the second edge of the at least a portion of the second plurality of discrete overlay portions is offset inwardly from the second edge of the at least a portion of the first plurality of discrete overlay portions; and
   a plurality of dimensional spacers secured to the inner-facing side of the substrate layer in areas underlying the first plurality of discrete overlay portions.

2. The article of apparel of claim 1, wherein the first overlay is formed from a heat reactive material.

3. The article of apparel of claim 1, wherein each of the plurality of dimensional spacers has a thickness of at least 1.5 millimeters.

4. The article of apparel of claim 1, wherein the plurality of dimensional spacers comprises of one of puff ink, reactive foam, 3-D printed foam, cut textile, silicone, laminate, and thermoplastic polyurethane.

5. The article of apparel of claim 1, wherein the substrate layer has a first elastic modulus and the first overlay has a second elastic modulus that is greater than the first elastic modulus.

6. The article of apparel of claim 1, wherein the plurality of dimensional spacers are bonded to the inner-facing side of the substrate layer.

7. The article of apparel of claim 1, further comprising a perimeter overlay having a first surface and an opposite second surface, the second surface of the perimeter overlay secured adjacent to the first surface of the at least a portion of the second plurality of discrete overlay portions, the second surface of the perimeter overlay further secured adjacent to the outer-facing side of the substrate layer.

8. The article of apparel of claim 7, wherein the perimeter overlay is secured to the first edge of the at least a portion of the second plurality of discrete overlay portions.

9. The article of apparel of claim 7, wherein the perimeter overlay is not secured to the second edge of the at least a portion of the second plurality of discrete overlay portions.

10. The article of apparel of claim 1, wherein each of the plurality of dimensional spacers is offset inwardly from the first edge and the second edge of the respective first plurality of discrete overlay portions by a margin of at least 1 millimeter.

11. An article of apparel comprising:
    a substrate layer that forms the article of apparel, the substrate layer having an inner-facing side and an opposite outer-facing side;
    a first overlay comprising a first plurality of discrete overlay portions each having a first edge and an opposite second edge, a first surface and an opposite second surface, the second surface of each of the first plurality of discrete overlay portions secured to the outer-facing side of the substrate layer, wherein each of the first plurality of discrete overlay portions has a width extending between the first edge and the opposite second edge;
    a second overlay comprising a second plurality of discrete overlay portions each having a first surface and an opposite second surface, wherein the second surface of at least a portion of the second plurality of discrete overlay portions is secured adjacent to the first surface of at least a portion of the first plurality of discrete overlay portions of the first overlay; and a plurality of dimensional spacers secured to the inner-facing side of the substrate layer in areas underlying the first plurality of discrete overlay portions, wherein a width of each of the plurality of dimensional spacers is less than the width of the each of the first plurality of discrete overlay portions.

12. The article of apparel of claim 11, wherein each of the second plurality of discrete overlay portions has a first edge and an opposite second edge, and wherein the second edge of the at least a portion of the second plurality of discrete overlay portions is offset inwardly from the second edge of the at least a portion of the first plurality of discrete overlay portions.

13. The article of apparel of claim 12, wherein the first edge of the at least a portion of the second plurality of discrete overlay portions is aligned with the first edge of the at least a portion of the first plurality of discrete overlay portions.

14. The article of apparel of claim 11, wherein the first overlay is formed from a heat reactive material.

15. The article of apparel of claim 11, wherein the each of the plurality of dimensional spacers has a thickness of at least 1.5 millimeters.

16. The article of apparel of claim 11, wherein the plurality of dimensional spacers comprises of one of puff ink, reactive foam, 3-D printed foam, cut textile, silicone, laminate, and thermoplastic polyurethane.

17. The article of apparel of claim 11, wherein the substrate layer has a first elastic modulus and the first overlay has a second elastic modulus that is greater than the first elastic modulus.

18. The article of apparel of claim 11, wherein the plurality of dimensional spacers are bonded to the inner-facing side of the substrate layer.

* * * * *